United States Patent
Kuiper et al.

(10) Patent No.: US 10,989,181 B1
(45) Date of Patent: Apr. 27, 2021

(54) ELECTROWETTING-BASED PUMP

(71) Applicant: Verily Life Sciences LLC, Mountain View, CA (US)

(72) Inventors: Stein Kuiper, South San Francisco, CA (US); Hojr Pisheh, Rohnert Park, CA (US)

(73) Assignee: Verily Life Sciences LLC, Mountain View, CA (US)

(*) Notice: Subject to any disclaimer, the term of this patent is extended or adjusted under 35 U.S.C. 154(b) by 84 days.

(21) Appl. No.: 16/179,002

(22) Filed: Nov. 2, 2018

Related U.S. Application Data

(60) Provisional application No. 62/585,960, filed on Nov. 14, 2017.

(51) Int. Cl.
*F04B 19/00* (2006.01)
*B01L 3/00* (2006.01)
(Continued)

(52) U.S. Cl.
CPC ........ *F04B 19/006* (2013.01); *B01L 3/50273* (2013.01); *B01L 3/502784* (2013.01);
(Continued)

(58) Field of Classification Search
CPC ....... B01L 3/502784; B01L 2400/0415; B01L 2200/0673; B01L 2400/0427; B01L 3/502715; B01L 3/50273; B01L 2200/027; B01L 3/5027; F04B 19/006; F04B 9/10; F04B 39/0011; F04B 43/043; F04B 43/06; Y10T 436/2575; B01F 13/0076

See application file for complete search history.

(56) References Cited

U.S. PATENT DOCUMENTS 3,214,615 A * 10/1965 Way .................. H02K 44/08
310/11
3,554,669 A * 1/1971 Reader .................. F04D 33/00
417/48
(Continued)

OTHER PUBLICATIONS

Singhal et al., "Low Reynolds Number Flow Through Nozzle-Diffuser Elements in Valveless Micropumps", Purdue University Purdue e-Pubs, CTRC Research Publications, Cooling Technologies Research Center, Apr. 26, 2004.
(Continued)

*Primary Examiner* — Peter J Bertheaud
(74) *Attorney, Agent, or Firm* — McDonnell Boehnen Hulbert & Berghoff LLP

(57) ABSTRACT

Microfluidic pumps are provided that use electrowetting to manipulate the location of one or more droplets of a working fluid (e.g., water) in order to pump tears, blood, laboratory samples, carrier fluid, or some other payload fluid. The working fluid is separated from the payload fluid by one or more droplets of an isolating fluid that is immiscible with the working fluid. The working fluid is manipulated via electrowetting, by applying voltages to two or more electrodes, to repeatedly move back and forth. Forces, pressures, and/or fluid flows exerted by the working fluid are coupled to the payload fluid via the droplet(s) of isolation fluid and reed valves, diffuser nozzles, or other varieties of valve can act as flow-rectifying elements to convert the coupled forces into a net flow of the payload fluid through the pump.

21 Claims, 7 Drawing Sheets

(51) Int. Cl.
*B01F 13/00* (2006.01)
*G01N 27/447* (2006.01)
*F04B 43/04* (2006.01)
*F04B 17/00* (2006.01)

(52) U.S. Cl.
CPC ..... *B01F 13/0076* (2013.01); *B01L 2200/027* (2013.01); *B01L 2400/0415* (2013.01); *B01L 2400/0427* (2013.01); *F04B 17/00* (2013.01); *F04B 43/046* (2013.01); *G01N 27/44791* (2013.01); *Y10T 436/2575* (2015.01)

(56) References Cited

U.S. PATENT DOCUMENTS

| | | | | |
|---|---|---|---|---|
| 6,629,826 | B2* | 10/2003 | Yoon | F04B 17/00 417/393 |
| 7,001,496 | B2* | 2/2006 | Parce | B01J 19/0093 204/600 |
| 8,470,149 | B2* | 6/2013 | Vann | B01J 4/008 204/450 |
| 8,562,305 | B2* | 10/2013 | Bau | B01L 3/5027 417/50 |
| 9,151,520 | B2* | 10/2015 | Despesse | F04B 19/006 |
| 2005/0106742 | A1 | 5/2005 | Wahl | |
| 2010/0000620 | A1* | 1/2010 | Fouillet | B01L 3/50273 137/827 |

OTHER PUBLICATIONS

Pollack, "Eletrowetting-Based Microactuation of Droplets for Digital Microfluidics", Duke University 2001.

Yun et al., "A Surface-Tension Driven Micropump for Low-Voltage and Low-Power Operations", Journal of Microelectromechanical Systems, vol. 11, No. 5, Oct. 2002.

Tang et al., "Liquid metal enabled pump", PNAS, vol. 111, No. 9, Mar. 4, 2014.

Lee et al., "Theory and Modeling of Continuous Electrowetting Microactuation", Mechanical and Aerospace Engineering Department.

Torniainen et al., "Bubble-Driven Inertial Micropump", Feb. 22, 2012.

Oprins et al., "Modeling, Design and Fabrication of a Novel Electrowetting Based Impingement Cooler".

* cited by examiner

ELECTROWETTING-BASED PUMP

CROSS-REFERENCE TO RELATED APPLICATION

This application claims priority to U.S. Provisional Patent Application No. 62/585,960, filed Nov. 14, 2017, which is incorporated herein by reference.

BACKGROUND

Unless otherwise indicated herein, the materials described in this section are not prior art to the claims in this application and are not admitted to be prior art by inclusion in this section.

A variety of applications can be facilitated by pumping small amounts of fluid and/or the use of a pump that is very small, that will operate on a very low power budget, or that is otherwise constrained. Such applications include lab-on-a-chip diagnostics (e.g., microfluidic pumps to move sample and/or reagent fluids through the chip), drug delivery, implanted and/or body-mounted wearable devices, or other applications. Current solutions for such constrained pumps may include moving parts (e.g., armatures, piezo membranes, valves) whose repeated flexure/movement may limit the lifetime of a device. Current solutions may, in some cases, involve a payload fluid (i.e., a blood sample or other fluid to be pumped) that is exposed to magnetic nanoparticles, solvents, electrode coatings, or other substances, which may limit the properties of the payload fluid, the types of analysis or manipulation of the payload fluid that can occur, or the types of application which can be facilitated (e.g., preventing the use of such a pump to pump fluids into a living biological tissue). Further, electrodes, membranes, surface coatings, or other elements of current solutions may be degraded by the contents of certain payload fluids (e.g., a dielectric layer of an electrode may be pitted by chloride ions in a payload fluid or fouled by proteins, cells, or other contents of a payload fluid), limiting the applications that can be facilitated by such solutions.

SUMMARY

Some embodiments of the present disclosure provide a device including: (i) a first channel having an inlet portion and an outlet portion; (ii) a second channel that has a first end which is coupled to the first channel at a first location along the first channel between the inlet portion and the outlet portion; (iii) a first valve and a second valve, wherein the first valve is disposed within the first channel between the first location and the inlet portion and the second valve is disposed within the first channel between the first location and the outlet portion; (iv) a first electrode, a second electrode, and a third electrode, wherein the first, second, and third electrodes are disposed within the second channel, wherein the second electrode is disposed within the second channel between the first electrode and the first end of the second channel, and wherein the third electrode is disposed within the second channel between the second electrode and the first end of the second channel; (v) a first fluid and a second fluid that are disposed within the second channel; and (iv) a third fluid that is immiscible with the first fluid and the second fluid and that is disposed within the second channel between the first fluid and the second fluid and in contact with the second electrode.

Some embodiments of the present disclosure provide a device including: (i) a first channel having an inlet portion and an outlet portion; (ii) a second channel that has a first end which is coupled to the first channel at a first location along the first channel between the inlet portion and the outlet portion; (iii) a first valve and a second valve, wherein the first valve is disposed within the first channel between the first location and the inlet portion and the second valve is disposed within the first channel between the first location and the outlet portion; (iv) a first electrode and a second electrode that are disposed within the second channel, wherein the second electrode is disposed within the second channel between the first electrode and the first end of the second channel; (v) a first fluid disposed within the second channel; and (vi) a second fluid disposed within the second channel, wherein the second fluid is immiscible with the first fluid, wherein the first fluid is disposed within the second channel between the second fluid and the first end of the second channel, and wherein the second fluid is in contact with at least one of the first electrode or the second electrode.

Some embodiments of the present disclosure provide a device including: (i) a first channel having an inlet portion and an outlet portion; (ii) a second channel that has a first end that is coupled to the first channel at a first location along the first channel between the inlet portion and the outlet portion; (iii) a first valve and a second valve, wherein the first valve is disposed within the first channel between the first location and the inlet portion, wherein the second valve is disposed within the first channel between the first location and the outlet portion; and (iv) a first electrode, a second electrode, and a third electrode that are disposed within the second channel, wherein the second electrode is disposed within the second channel between the first electrode and the first end of the second channel, and wherein the third electrode is disposed within the second channel between the second electrode and the first end of the second channel.

Some embodiments of the present disclosure provide a device including: (i) a first channel having an inlet portion and an outlet portion; (ii) a second channel that has a first end which is coupled to the first channel at a first location along the first channel between the inlet portion and the outlet portion; (iii) a first valve and a second valve, wherein the first valve is disposed within the first channel between the first location and the inlet portion and the second valve is disposed within the first channel between the first location and the outlet portion; and (iv) a first electrode and a second electrode that are disposed within the second channel, wherein the second electrode is disposed within the second channel between the first electrode and the first end of the second channel.

Some embodiments of the present disclosure provide a method for operating a device to pump fluid. The device includes: (a) a first channel having an inlet portion and an outlet portion; (b) a second channel that has a first end that is coupled to the first channel at a first location along the first channel between the inlet portion and the outlet portion; (c) a first valve and a second valve, wherein the first valve is disposed within the first channel between the first location and the inlet portion, wherein the second valve is disposed within the first channel between the first location and the outlet portion; (d) a first electrode, a second electrode, and a third electrode that are disposed within the second channel, wherein the second electrode is disposed within the second channel between the first electrode and the first end of the second channel, and wherein the third electrode is disposed within the second channel between the second electrode and the first end of the second channel; (e) a first fluid and a second fluid that are disposed within the second channel; and (f) a third fluid that is immiscible with the first fluid and the second fluid, wherein the third fluid is disposed within the second channel between the first fluid and the second fluid and in contact with the second electrode. The method includes: (i) applying, during a first period of time, a voltage between the first electrode and the second electrode; and (ii) applying, during a second period of time, a voltage between the third electrode and the second electrode.

Some embodiments of the present disclosure device including: (i) a first channel having an inlet portion and an outlet portion; (ii) a second channel, wherein a first end of the second channel is coupled to the first channel at a first location along the first channel between the inlet portion and the outlet portion; (iii) a first flow director located at the first location, wherein the first flow director is configured to direct a fluid flow from the second channel into the first channel toward the outlet portion of the first channel; (iv) a first electrode, a second electrode, and a third electrode, wherein the first, second, and third electrodes are disposed within the second channel, wherein the second electrode is disposed within the second channel between the first electrode and the first end of the second channel, and wherein the third electrode is disposed within the second channel between the second electrode and the first end of the second channel; (v) a first fluid and a second fluid, wherein the first and second fluids are disposed within the second channel; and (vi) a third fluid, wherein the third fluid is immiscible with the first fluid and the second fluid, wherein the third fluid is disposed within the second channel between the first fluid and the second fluid and in contact with the second electrode.

These as well as other aspects, advantages, and alternatives, will become apparent to those of ordinary skill in the art by reading the following detailed description, with reference where appropriate to the accompanying drawings.

DETAILED DESCRIPTION

Figure 1A:
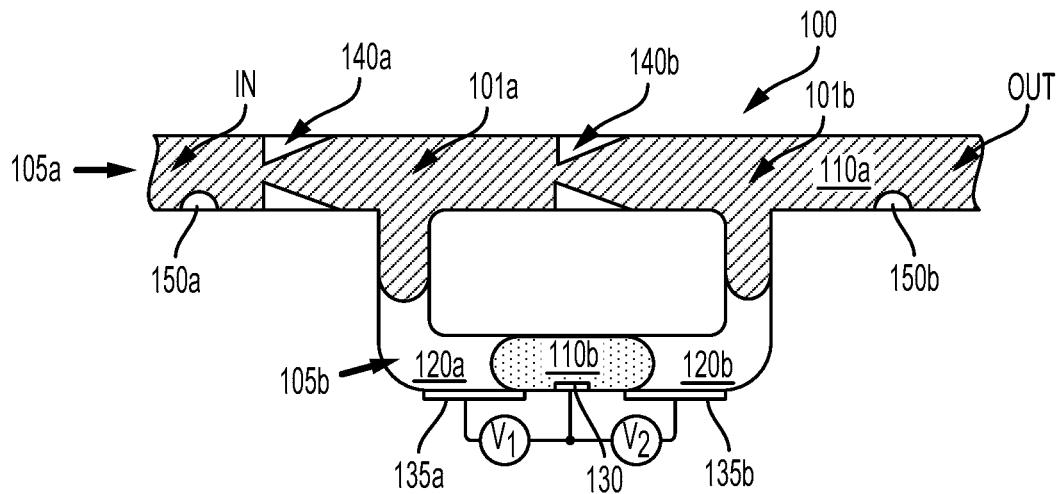
FIG. 1A is a schematic illustration of an example pump.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A variety of applications may be facilitated by a small, low-power, long-lifetime pump. In some examples, such a pump may include mechanical valves, oscillating membranes (e.g., actuated by and/or composed of piezoelectric materials), or other moving parts that can reduce the operational lifetime of the pump. Some pump designs induce bubbles in a fluid to be pumped (a "payload fluid"), expose the payload fluid to magnetic nanoparticles, reagents, surfactants, surface coatings, or other substances, or otherwise manipulate the payload fluid in such a way that the payload fluid may be altered in a manner that may be undesirable in certain applications. Electrowetting may be used to transport a payload fluid (e.g., to pump the payload fluid), however, exposure of dielectrics or other electrode materials to certain substances in a payload fluid (e.g., chloride ions, other ions, reactive oxygen species, proteins) may cause degradation of such an electrowetting pump and/or the generation of radicals, electrode metal ions, or other unwanted substances in the payload fluid.

To provide an improved pump, electrowetting may be used to manipulate a droplet of a "working fluid" (e.g., a droplet of aqueous saline solution). The droplet of working fluid can be isolated from a payload fluid (e.g., tears, blood, interstitial fluid, a saline solution that contains a drug) by one or more droplets of an "isolation fluid" that is immiscible with the working fluid and the payload fluid (e.g., a silicone oil or other nonpolar solution). The working fluid can transduce voltages applied to electrowetting electrodes into mechanical energy, and the one or more droplets of isolation fluid can couple forces, pressures, fluid flows, or other mechanical energy from the working fluid into the payload fluid. Diffusers, flow directors, deformable membranes, nozzles, nozzle-diffusers, mechanical leaves, or other elements of valves or other means for fluid flow rectification could then be used to convert the time-varying pressures or other mechanical effects on the payload fluid into a net flow of the payload fluid in a desired direction through the pump. The isolation between the payload fluid and the working fluid that is provided by the droplet(s) of isolation fluid can reduce migration of substances from the working fluid (e.g., surfactants used to improve operation of the electrowetting elements of the pump) into the payload fluid, or vice-versa (e.g., chloride or other ions, proteins, cells, or other biological substances). This isolation may prevent fouling of the payload fluid, may prevent fouling or damage of electrodes of the pump by substances present in the payload fluid, may permit the use of surfactants or other substances in the working fluid that are not compatible with the payload fluid and/or applications thereof, or may provide some other benefits.

In an example embodiment, such a pump could include a first channel, through which the pump pumps a payload fluid, and a second channel in which are disposed a droplet of working fluid and at least one droplet of isolation fluid. The isolation fluid is immiscible with both the working fluid and the payload fluid. The second channel, alternatively referred to as a "shuttle channel," is coupled to the first channel, alternatively referred to as a "payload channel," at a first location along the first channel. The shuttle channel may be connected to the payload channel at a further location (e.g., upstream or downstream from the first location, relative to the flow of payload induced by the pump) or may be connected to something else (e.g., an environment of the device, to another payload channel to provide another pump channel for redundancy or for some other purpose). The droplet(s) of isolation fluid are disposed in the shuttle channel between the droplet of working fluid and the payload fluid. Two, three, or more electrodes are disposed in the shuttle channel (e.g., either on the walls of the shuttle channel or penetrating into the lumen of the shuttle channel) and can be operated (by applying voltages between pairs of such electrodes during respective different periods of time) to manipulate the droplet of working fluid. Such manipulations can be transmitted, via the droplet(s) of isolation fluid, into the payload fluid. Further, two or more valves (e.g., nozzle-diffusers, flow directors, leaflet valves or other types of mechanical valves) disposed in the payload channel opposite the first location could be used to translate such manipulations into a net flow of payload fluid through the payload channel.

Such a pump could be incorporated into a lab-on-a-chip or other microfluidic system to facilitate pumping of sample fluids, reagents, or other substances throughout microfluidic channels of the system. In another example, such a pump could be incorporated into an implanted or body-mounted (e.g., eye-mounted) device to deliver drugs from a reservoir, to access samples of fluid from tissues, to return such samples to the tissues, or to facilitate some other application of such devices. In yet another example, such a pump could facilitate control of fluids in a small or otherwise constrained device. For example, an electronically actuated lens (that is part of, e.g., a camera, a microscope, a contact lens, or an intraocular lens) could include two or more immiscible fluids whose geometry within a lens chamber of the lens is related to the overall optical power of the actuated lens. Such an actuated lens could be coupled to a pump as described herein to control an overall optical power of the lens, e.g., by pumping an amount of one or more immiscible fluids into or out of a lens chamber.

II. Example Device

As noted above, there are a variety of applications that can be facilitated by a pump that has small dimensions, a low power budget, or that is otherwise constrained. Such a pump may include a droplet of a working fluid (e.g., saline) that is isolated from, and coupled to, a payload fluid (e.g., tears, blood, interstitial fluid, a drug compound or formulation) via one or more droplets of an isolation fluid (e.g., an oil). The droplet of working fluid and the droplet(s) of isolation fluid are disposed within a shuttle channel that is connected to a payload channel and electrodes disposed within the shuttle channel in contact with the droplets of working fluid and isolation fluid can then be operated to generate alternating pressures, forces, fluid flows, or other mechanical events which couple into the payload fluid. Valves disposed within the payload channel then translate those mechanical events into a net flow of the payload fluid through the payload channel.

The separation between the contents of the working fluid (e.g., surfactants) and the contents of the payload fluid (e.g., chloride or other ions, proteins, cells) can provide a variety of benefits to the efficiency and operation of the pump, to the operational lifetime of the pump, to the contents of the payload fluid, or other benefits. For example, this isolation can prevent the payload fluid from being contaminated or altered (e.g., by chemical reactions that may occur at an electrode surface, e.g., redox reactions). This isolation can further prevent the working fluid and/or electrodes from being degraded (e.g., by biological fouling, by reduction of electrowetting efficacy by the presence of ions which permit increased capacitive charging of electrodes, by pitting of electrode dielectric layers by chloride ions from the payload fluid).

The motion of the droplet of working fluid in such a pump involves no moving parts, increasing the lifetime of the pump relative to pumps which may include moving parts (e.g., impellers, rotors, pistons, bearings, valves, piezo- or otherwise-actuated membranes). Additionally, the working fluid and electrodes are isolated from chloride, proteins or other biological substances, or other substances in the payload fluid that could degrade the operation of the pump (e.g., by pitting dielectrics or damaging other elements of the electrodes), further extending the lifetime of such a pump.

Such a pump may include valves to control fluid flows within a payload channel or within some other portion of the pump. In some examples, such a pump may include diffusers, flow directors, or other types of valves that lack moving parts and that are not easily hindered by small particles, further extending the lifetime of such a pump. In some examples, a valve could include one or more elements that deform, translate, rotate, or otherwise actuate mechanically to effect rectification of fluid flows through the valve. Such valves are referred to herein as "mechanical valves." Mechanical valves may include, without limitation, check valves, reed valves, Tesla valves, duckbill valves, leaf valves, or other types of valves that include leaves, membranes, or other mechanical elements configured to deform, translate, rotate, move, or otherwise mechanically actuate to cause a preference for fluid flow through the valve in a preferred direction.

As used herein, "valve" refers broadly to elements that can act to rectify or otherwise control fluid flow through a region. This could include substantially blocking all fluid flow in a non-preferred direction. For example, a valve of a device as described herein could include a mechanical check valve. Alternatively, a valve could act less efficiently to rectify fluid flows such that fluid flows may occur in both preferred and non-preferred directions. In such examples, fluid flow in the preferred direction is less impeded by the valve under certain conditions, e.g., under certain pressures, pressure drops, flow rates, or some other conditions. For example, a valve of such a device could include a diffuser configured such that the diffuser presents a greater resistance to flows in a non-preferred direction (e.g., when a pressure drop across the diffuser is directed in the non-preferred direction) than in a preferred direction (e.g., when a pressure drop across the diffuser is directed in the preferred direction).

FIG. 1A illustrates, in a cross-sectional schematic, an example embodiment of a pump 100 as described herein. The pump 100 includes a first channel 105a (the straight channel at the top of the pump 100, alternatively referred to as a payload channel) that contains a payload fluid 110a. The payload channel 105a includes an inlet portion ("IN") and an outlet portion ("OUT"). During operation of the pump 100, the payload fluid 110a may be pumped from the inlet portion toward the outlet portion. The inlet portion and/or the outlet portion may be in fluid communication with a drug reservoir, a sample container, a reagent reservoir, a lens chamber of an adjustable lens, an external environment of a device (e.g., tear fluid on the surface of an eye, blood within a portion of vasculature, interstitial fluid within a tissue) according to an application of the pump 100 and/or of a device or system that includes the pump.

A second channel 105b (the U-shaped channel at the bottom of the pump 100, alternatively referred to as a shuttle channel) has a first end coupled to the payload channel 105a at a first location 101a along the payload channel 105a. A first diffuser 140a is disposed within the payload channel 105a between the first location 101a and the inlet portion of the payload channel 105a and a second diffuser 140b is disposed within the payload channel 105a between the first location 101a and the outlet portion of the payload channel 105a. The shuttle channel 105b also includes a second end that is coupled to a second location 101b along the payload channel 105a, between the second diffuser 140b and the outlet portion of the payload channel 105a.

The first 140a and second 140b diffusers act as valves to control flow through the payload channel 105a. That is, under the pressures, flow rates, and other expected operational conditions of the pump 100, the diffusers 140a, 140b provide more resistance to fluid flow in one direction (e.g., the direction from the outlet portion toward the inlet portion) than to fluid flow in the opposite, preferred direction. The diffusers 140a, 140b can be formed to have a variety of different internal geometries such that the diffusers 140a, 140b act as diffusers for fluid flows in the preferred direction while acting as nozzles for fluid flows in the opposite, non-preferred direction. For example, the diffusers 140a, 140b can have a conical, pyramidal, or some other narrowing geometry such that the diffusers 140a, 140b present more resistance to fluid flow in one direction (from the outlet portion to toward the inlet portion) than in the opposite direction.

A first droplet of fluid 120a, a second droplet of fluid 120b, and a third droplet of fluid 110b are disposed within the shuttle channel 105b, along with an amount of the payload fluid 110a. The first 120a and second 120b droplets of fluid (alternatively referred to as first 120a and second 120b isolator droplets) are composed of a substance that is immiscible with both the third droplet (alternatively referred to as a working droplet 110b) and with the payload fluid 110a. For example, the isolator droplets 120a, 120b could be composed of oil (e.g., silicone oil) or some other nonpolar substance and the payload fluid 110a and working droplet 110b could be composed of aqueous substances (e.g., the working droplet could be composed of a saline solution). The working droplet 110b is disposed within the shuttle channel 105b between the first 120a and second 120b isolator droplets.

Note that a pump as described herein could include droplets and/or payload fluids having different properties. Note further that the isolator droplets 120a, 120b may be composed of different substances (e.g., of oils or other nonpolar solutions having differing compositions). In examples wherein the payload fluid is nonpolar, a pump as described herein may include a single polar working droplet and no isolator droplets. In another example, the payload could be nonpolar and a polar working fluid droplet could be isolated from the nonpolar payload fluid but multiple alternating nonpolar and polar isolation droplets.

First 135a, second 130, and third 135b electrodes are disposed within the shuttle channel 105b to facilitate manipulation of the working droplet 110b via electrowetting, e.g., by applying voltages between pairs of the electrodes 135a, 135b, 135c by voltage sources $V_1$, $V_2$ in order to control the relative wetting properties and/or surface energies of the electrodes 135a, 135b, 135c with respect to the fluids composing the droplets 110b, 120a, 120b. Such voltage sources may be elements of a controller configured to operate the pump 100 to pump payload fluid 110a from the inlet portion toward the outlet portion of the payload channel 105a). The working droplet 110b is in contact with at least the second electrode 130 such that the working droplet 110b may be induced to move along the shuttle channel 105b (e.g., toward one or the other of the first 135a or third 135b electrodes) by applying voltages (e.g., DC voltages, time-varying voltages) between the second electrode 130 and one of the first 135a or third 135b electrodes. Such motion of the working droplet 110b can effect a change in the pressure, motion, flow, or other properties of the payload fluid 110a via the isolator droplets 120a, 120b. Such changes can then be translated, via the action of the diffusers 140a, 140b, into a net flow of the payload fluid 110a from the inlet portion toward the outlet portion of the payload channel 105a.

Figure 1B:
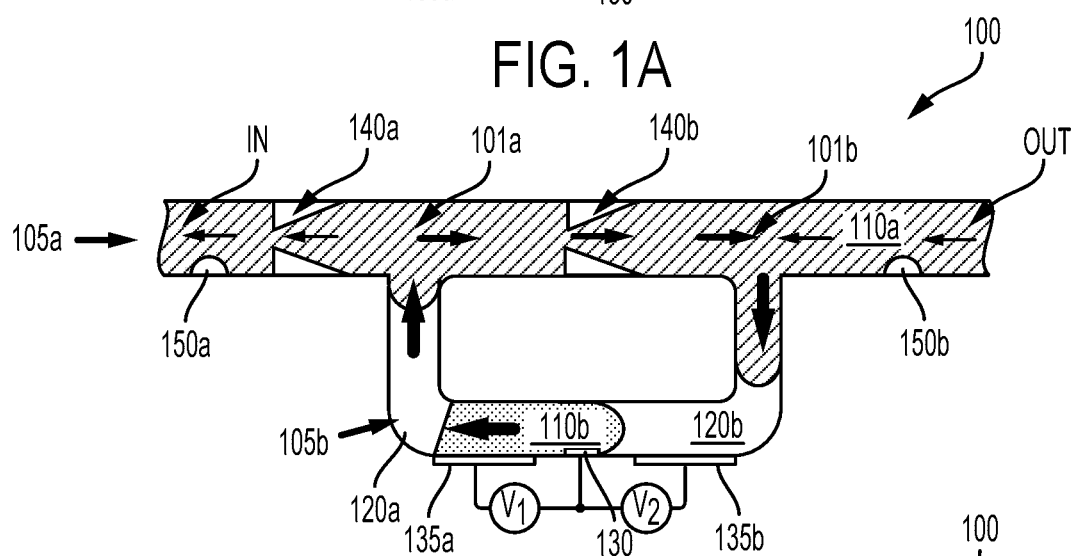
FIG. 1B is a schematic illustration of the example pump of FIG. 1A being operated during a first period of time.

This is illustrated, during a first period of time, by FIG. 1B. A voltage is being applied between the first 135a and second electrodes 130 by the first voltage source $V_1$. As a result, the working droplet 110b has moved to the left (along the shuttle channel 105b, toward the first location 101a of the payload channel 105a). The motion of the working droplet 110b causes fluid flows through the shuttle channel 105b and the payload channel 105a (illustrated in FIG. 1B by the arrows; the magnitude of flow through a particular portion of the pump 100 is indicated by the weight of the arrow). Additionally, this operation causes a pressure within the first location 101a to be greater than pressures in the second location 101b and the inlet portion. Accordingly, fluid flows occur in a non-preferred direction through the first diffuser 140a and in a preferred direction through the second diffuser 140b out of the first location 101a.

Thus, a larger magnitude of fluid flow occurs, during the first period of time, through the second diffuser 140b toward the outlet portion, and a smaller fluid flow occurs through the first diffuser 140a toward the inlet portion. The highest magnitude flow during the first period of time is through the shuttle channel 105b, from the second location 101b toward the first location 101b. As a result, a small magnitude flow of the payload fluid 110a occurs from the outlet portion toward the inlet portion during the first period of time.

Figure 1C:
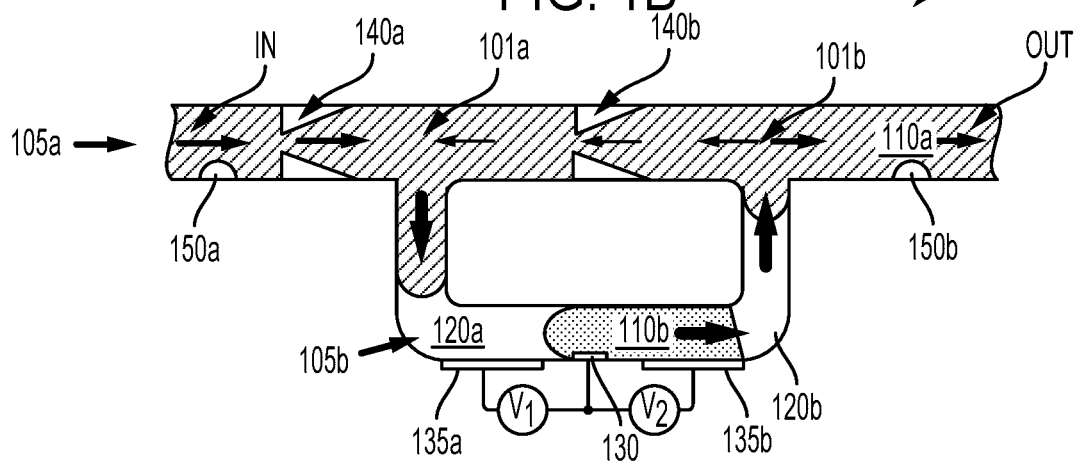
FIG. 1C is a schematic illustration of the example pump of FIG. 1A being operated during a second period of time.

In order to produce a net flow of the payload fluid 110a from the inlet portion toward the outlet portion of the payload channel 105a, the pump may be operated to move the working droplet 110b back and forth along the shuttle channel 105b. Such operation, during a second period of time, is illustrated by FIG. 1C. A voltage is now being applied between the third 135a and second electrodes 130 by the second voltage source $V_2$. As a result, the working droplet 110b has moved to the right (along the shuttle channel 105b, toward the second location 101b of the payload channel 105a). The motion of the working droplet 110b causes fluid flows through the shuttle channel 105b and the payload channel 105a (illustrated in FIG. 1C, as in FIG. 1B by arrows). Additionally, this operation causes a pressure within the first location 101a to be less than pressures in the second location 101b and the inlet portion. Accordingly, fluid flows occur in a preferred direction through the first diffuser 140a and in a non-preferred direction through the second diffuser 140b into the first location 101a.

Thus, a larger magnitude of fluid flow occurs, during the second period of time, through the first diffuser 140a, toward the outlet portion, and a smaller fluid flow occurs through the second diffuser 140b toward the inlet portion. The highest magnitude flow is through the shuttle channel 105b, from the first location 101a toward the second location 101b. As a result, a larger magnitude flow of the payload fluid 110a occurs from the inlet portion toward the outlet portion during the second period of time. As the magnitude of this overall flow is greater, the electrodes 135a, 135b, 130 of the pump 100 can be operated, during alternating periods of time, to move the working droplet 110b in opposite directions along the shuttle channel 105b to result in a net flow of payload fluid 110a from the inlet portion toward the outlet portion of the payload channel 105a.

Application of a voltage between a pair of the electrodes (e.g., between the first 135a and second 130 electrodes) may cause motion of the working droplet 110b by exerting an electromechanical force between the working droplet 110b and the electrode(s). For example, the first electrode 135b could include a dielectric coating or could be otherwise configured to capacitively couple with the interior of the shuttle channel 105b (e.g., with one or both of the first droplet 120a or the working droplet 110b) and the second electrode 130 could be in conductive, ohmic contact with the working droplet 110b. The applied voltage could be a DC voltage, e.g., a substantially constant 5V across a particular period of time. Alternatively, a time-varying voltage waveform could be applied to manipulate the location or motion of the working droplet 110b. For example, applying a voltage between a pair of the electrodes could include applying a square waveform, a triangular waveform, a sinusoidal waveform, or some other time-varying waveform to the pair of electrodes.

Applying a time-varying waveform could provide benefits relative to applying a DC voltage. For example, if ions or other substances are present in the isolation droplets 120a, 120b, such substances could reduce the efficacy of an applied DC voltage in moving the working droplet 110b along the shuttle channel 105b (e.g., by developing ion concentrations at the surface of the electrodes that partially cancel the applied voltage) relative to a time-varying applied voltage waveform. A frequency of variation of such a time-varying applied voltage (e.g., a frequency of an applied square waveform) could be greater than a characteristic time of motion of the working droplet 110b within the shuttle channel 105b in response to applied voltages (e.g., greater than 100 Hz, greater than 1 kHz). Alternatively, the use of a DC voltage may provide lower-power operation of the pump.

First 150a and/or second 150b sensors are optionally included to detect a property of fluid in the payload channel 105a, e.g., to detect an amount of an analyte in the payload fluid, to detect a conductivity or viscosity of the payload fluid, to count cells in the payload fluid, or to detect some other property of the payload fluid. By way of example, first 150a and second 150b sensors are disposed within the inlet portion and outlet portion, respectively, of the payload channel 105a. The pump could act to access amounts of the payload fluid from an environment of interest (e.g., from a tear film of an eye, from a portion of vasculature, from a biological tissue, from a lake, stream, or other natural environment, from a fluid of an industrial, pharmaceutical, or food processing process) such that one or both of the sensors 150a, 150b may detect properties of the fluid in the environment.

To further reduce migration of substances (e.g., ions, proteins) between a payload fluid (e.g., 110a) and a droplet of working fluid (e.g., 110b), multiple droplets of isolation fluid may alternate with droplets of working fluid in a shuttle channel (or other channel) of such a pump. For example, a payload fluid could be in contact with a first droplet of oil or other isolation fluid, which could be in contact with a first droplet of saline or other working fluid, which is in turn in contact with a second droplet of isolation fluid, which is in contact with a second droplet of working fluid. The second droplet of working fluid is also in contact with one or more electrodes such that the second droplet of working fluid may be manipulated via electrowetting to effect pumping of the payload fluid. In another example, the payload fluid and working fluid could differ with respect to their polarity. For example, the payload fluid could be an oil or other nonpolar substance and the working droplet could be saline (or some other aqueous and/or polar substance). In such an example, the working fluid could be in contact with a first isolation droplet of a nonpolar fluid, which is in contact with a second isolation droplet of a polar fluid, which second isolation droplet is in contact with the polar payload fluid. Additionally or alternatively, one or more membranes could be disposed between droplets/fluids of a pump as described herein, e.g., between the payload fluid 110a and the first isolation droplet 120a.

The composition of fluids (e.g., working droplet 110a, isolation droplets 120a, 120b) of a pump as described herein could be specified to facilitate the energy efficiency of such a pump, to enhance a degree of isolation between a payload fluid and such fluids of the pump, to increase a lifetime of the pump, or to provide some other benefit. This could include adding surfactants, polar and/or ionic substances, nonpolar substances, to the fluid(s) or otherwise specifying a composition of the working droplet 110a and/or isolation droplets 120a, 120b to control an interfacial energy between the droplets, between the droplets and a payload fluid, and/or to control an interfacial energy between the droplets and internal surfaces of the pump (e.g., of a payload channel, of a shuttle channel).

Additionally or alternatively, the composition of the material composing the internal surfaces of the pump could be specified to control the interfacial energy between the internal surfaces and the droplets. For example, a hydrophobic, hydrophilic, superhydrophilic, or oleophobic coating, texture, or substance could be disposed on internal surfaces of the payload channel 105a to prevent the isolation droplets 120a, 120b (in examples wherein the isolation droplets 120a, 120b comprise nonpolar fluids) from exiting the shuttle channel 105b. Additionally or alternatively, such coatings could be disposed on surfaces within the shuttle channel 105b to maintain the working droplet 110b and/or isolation droplets 120a, 120b at specified locations or ranges of locations within the shuttle channel 105b. For example, the surface of electrode 130 may include an underwater oleophobic surface in order to maintain the working droplet 110a in contact with the electrode 130. In such an example, a non-polar isolation droplet 120a, 120b may be prevented from wetting the electrode 130 surface and thus may be prevented from displacing the working droplet 110a from the electrode 130.

As noted above, a pump as described herein (e.g., pump 100) includes two, three, or more electrodes disposed within one or more channels of the pump. Voltages, currents, or other electrical signals can be applied to such electrodes to electronically control the location, motion, or other properties of one of more droplets of fluid within such a pump in order to effect a net flow of a payload fluid through the pump. The electrodes 135a, 130, 135b could include conductive materials (e.g., aluminum, titanium, gold, copper, indium tin oxide, or other materials) disposed at respective locations within the pump (e.g., on surfaces within the shuttle channel 105b). Such deposition could include forming the electrodes in place (e.g., by sputtering, chemical vapor deposition, polymerization, deposition of a carrier fluid containing nanowires or other materials in suspension followed by evaporation of the carrier fluid, by photolithography or other processes for patterning or etching materials in place) and/or forming the electrodes and subsequently disposing them on internal surfaces of the lens chamber 201 (e.g., by using an adhesive to adhere a metal foil, wire, rod, tube, cone, textured surface, or other formed conductive material to a surface within the pump).

Additionally or alternatively, one or more of the electrodes could include wires, rods, cones, textured surfaces, or other elements that are disposed on and/or that penetrate through an internal surface of the pump and that protrude into a channel or other volume of the pump. Laser etching or other subtractive means could be used to form such electrodes. For example, the electrodes 135a, 130, 135b could be formed from a single section of a conductive tube or foil that has been disposed within the shuttle channel 105b. The single section of conductive tube or foil could then be cut using a laser or other means to provide three (or more) discrete, electrically separated electrodes 135a, 130, 135b.

One or more of the electrodes could further include a dielectric layer disposed between such a conductive material and a fluid-containing volume of the pump. For example, the first electrode 135a and third electrode 135b could each include such a dielectric layer. Such a dielectric layer could be provided to prevent large, direct currents from passing from the electrodes into fluids within the pump, to provide a capacitive electrical coupling between the electrode and such fluids, to limit an amount of charge that can be transmitting into such fluids via the electrode.

Such a dielectric layer could be a separate material (e.g., parylene) deposited on the conductive material (e.g., via CVD, spin coating, or some other process). Additionally or alternatively, the dielectric layer of such an electrode could be formed from the conductive material of the electrode, e.g., the dielectric layer could be a nonconductive layer of aluminum oxide formed by oxidation of an underlying aluminum metal of the electrode. Such a dielectric layer could be formed via anodization or other electrically-driven reactions at the surface of the electrode. Additionally or alternatively, such a dielectric layer could be formed by redox reactions between fluids disposed in the pump and the material of the electrode. The surface of such a dielectric layer could be made hydrophilic (e.g., by exposure to a fluorosilane vapor).

One or more channels (e.g., a payload channel, a shuttle channel) or other elements of a pump as described herein (e.g., pump 100) may be formed of one or more polymeric materials, glasses, metals, ceramics, semiconductors, or other materials. The polymeric materials can include biocompatible materials similar to those employed to form implants, vision correction lenses, IOLs, or other implantable devices, such as polyethylene terephthalate ("PET"), polymethyl methacrylate ("PMMA"), silicone hydrogels, rigid, gas-permeable polymeric materials, barrier materials that block diffusion of gases or other substances, combinations of these, etc. The polymeric materials could include flexible and/or foldable water-permeable materials. For example, the polymeric material could include a copolymer comprising 2-phenylethyl acrylate units and 2-phenylethyl methacrylate units. Units of a polymer or copolymer could be cross-linked by an applicable cross-linking agent or unit, e.g., by 1,4-butanediol diacrylate units, 1,6-hexanediol diacrylate units, or some other crosslinking agent or combination of such agents. Such flexible and/or foldable materials may be included in the construction of a device that includes a pump as described herein to permit the device to be rolled, folded, or otherwise manipulated such that the device may be inserted into a human body (e.g., into an eye) through an incision that is smaller than, e.g., a diameter or other characteristic dimension of the unrolled or un-folded device.

A pump as described herein could be fabricated according to a variety of methods. In some examples, such a pump could be formed from two molded elements that are then adhered together. For example, a first flat substrate that has disposed thereon one or more electrodes or other electronic elements could be fabricated and then adhered to a molded portion having molded therein features corresponding to channels, diffusers, nozzles, deformable membranes, deformable and/or movable mechanical leaves, valves, flow directors, or other elements of the pump. One or more fluids of such a pump could be added during assembly of the pump. For example, one or more droplets of oil or some other nonpolar substance and/or one or more droplets of saline or some other aqueous or otherwise polar substance could be deposited at respective locations of a molded portion having molded therein features corresponding to elements of the pump. A second element (e.g., another molded portion, a flat substrate) could then be adhered to the molded portion to form the pump having working droplets, isolator droplets, etc. disposed therein.

Additionally or alternatively, one or more fluids (e.g., one or more droplets of fluid) of such a pump could be introduced into such a pump following assembly of portions of the pump. In some examples, a pump as described herein could be provided dry (e.g., not containing any aqueous, polar, nonpolar, or other fluids) and fluids could be later added to the pump (e.g., by an end user). This could include flushing the pump with a first fluid (e.g., a saline solution or other aqueous solution) and then adding one or more droplets of a second fluid (e.g., an oil) to from isolator droplets or other fluid elements of the pump. Such droplets of fluid could be introduced into appropriate locations within the pump (e.g., within a shuttle channel of the pump) using a needle or other means for such deposition. For example, the pump could include one or more septums disposed between an external environment of the pump and a channel (e.g., a shuttle channel) of the device and a needle or some other means could be used to introduce an amount of a fluid into the channel via the septum.

Certain fluids (e.g., droplets of oil) could be omitted from such a pump to facilitate transport, assembly, implantation, or some other manipulations or processes related to the assembly or use of the pump. For example, the pump could be part of a flexible implantable device which is to be manipulated (e.g., folded, rolled) prior to insertion into a body (e.g., into an eye). In such an example, droplets of oil present in the pump could be moved from a desired location (e.g., from a location in a shuttle channel into a payload channel), diminishing the functionality of such an implanted device. In such examples, the oil (or other fluids) could be added following implantation or other manipulations. Additionally or alternatively, one or more of the fluids of such a device could be composed of a substance having a specified melting point such that the substance is a solid, gel, or otherwise non-flowing during assembly, implantation, or other manipulations of the device.

The melting point could be specified such that the substance is fluid at an operating temperature of the device. For example, the device could be an implantable device (e.g., part of an intraocular lens) and isolation droplets of a pump of the device could be composed of a substance having a melting point that is less than human body temperature (e.g., less than 37 degrees Celsius). The melting point could be above some other specified temperature (e.g., above 0 degrees Celsius, above room temperature, e.g., above 21 degrees Celsius) and the device could be maintained below the specified temperature (e.g., by active cooling, by being exposed to an environment that is cooler than the specified temperature) until the device is installed, implanted, assembled, or otherwise manipulated into an operational configuration or location.

The pump 100 illustrated in FIGS. 1A-C is intended as a non-limiting example embodiment of a pump as described herein; other configurations of such pump or other device are anticipated. For example, a shuttle channel of such a pump could be connected at only one end to a payload channel of such a pump. The other end of such a shuttle channel could be connected to an environment of the device (e.g., to facilitate introduction of droplets of oil or other fluids into the shuttle channel during assembly of the device and/or to facilitate replacement of such fluids or cleaning of the pump). Additionally or alternatively, such a shuttle channel could be connector at its other end to another payload channel of pump, e.g., to facilitate pumping of multiple payload fluids (e.g., from respective different sources in the environment of the device and/or reservoirs within the device), to provide redundancy in the event that one of the payload channels is blocks or otherwise fails, or to facilities some other application.

Figure 2A:
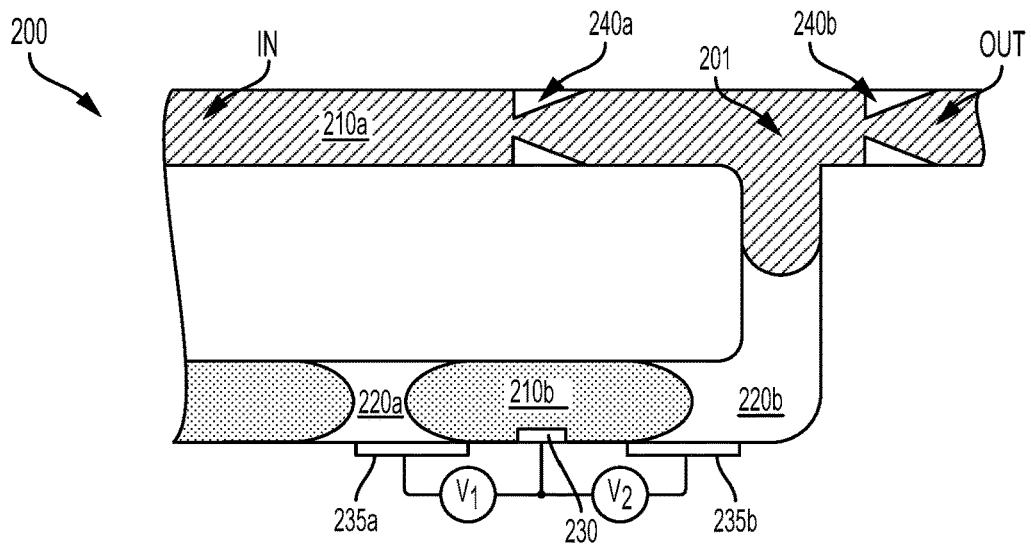
FIG. 2A is a schematic illustration of an example pump.

FIG. 2A illustrates, in a cross-sectional schematic, an example embodiment of such a pump 200. The pump 200 includes a first channel (the straight channel at the top of the pump 200, alternatively referred to as a payload channel) that contains a payload fluid 210a. The payload channel includes an inlet portion ("IN") and an outlet portion ("OUT"). During operation of the pump 200, the payload fluid 210a may be pumped from the inlet portion toward the outlet portion. The inlet portion and/or the outlet portion may be in fluid communication with a drug reservoir, a sample container, a reagent reservoir, a lens chamber of an adjustable lens, an external environment of a device (e.g., tear fluid on the surface of an eye, blood within a portion of vasculature, interstitial fluid within a tissue) according to an application of the pump 200 and/or of a device or system that includes the pump.

A second channel (the L-shaped channel at the bottom of the pump 200, alternatively referred to as a shuttle channel) has a first end coupled to the payload channel at a first location 201 along the payload channel. A first diffuser 240a is disposed within the payload channel between the first location 201 and the inlet portion of the payload channel and a second diffuser 240b is disposed within the payload channel between the first location 201 and the outlet portion of the payload channel. The shuttle channel also includes a second end that may be coupled to some other element or location of a device that includes the pump 200 (e.g., to an external environment of such a device, to another payload channel). The first 240a and second 240b diffusers act as valves to control flow through the payload channel.

A first droplet of fluid 220a, a second droplet of fluid 220b, and a third droplet of fluid 210b are disposed within the shuttle channel, along with an amount of the payload fluid 210a. The first 220a and second 220b droplets of fluid (alternatively referred to as first 220a and second 220b isolator droplets) are composed of a substance that is immiscible with both the third droplet (alternatively referred to as a working droplet 210b) and with the payload fluid 210a. The working droplet 210b is disposed within the shuttle channel between the first 220a and second 220b isolator droplets.

First 235a, second 230, and third 235b electrodes are disposed within the shuttle channel to facilitate manipulation of the working droplet 210b via electrowetting, e.g., by applying voltages between pairs of the electrodes 235a, 235b, 230 by voltage sources $V_1$, $V_2$. The working droplet 210b is in contact with at least the second electrode 230 such that the working droplet 210b may be induced to move along the shuttle channel by applying voltages between the second electrode 230 and one of the first 235a or third 235b electrodes. Such motion of the working droplet 210b can effect a change in the pressure, motion, flow, or other properties of the payload fluid 210a via the isolator droplets 220a, 220b. Such changes can then be translated, via the action of the diffusers 240a, 240b, into a net flow of the payload fluid 210a from the inlet portion toward the outlet portion of the payload channel.

Figure 2B:
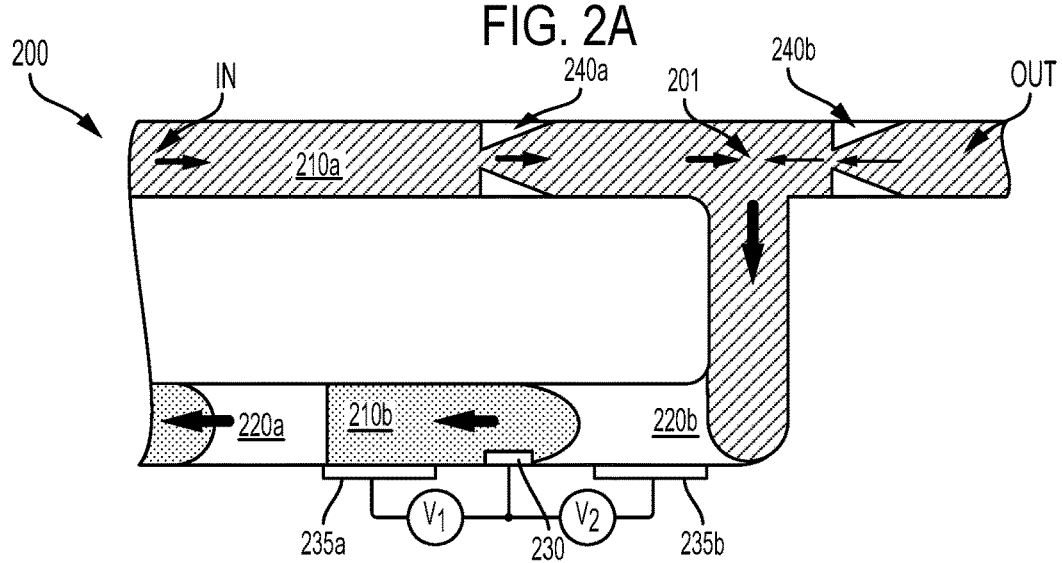
FIG. 2B is a schematic illustration of the example pump of FIG. 2A being operated during a first period of time.

This is illustrated, during a first period of time, by FIG. 2B. A voltage is being applied between the first 235a and second electrodes 230 by the first voltage source $V_1$. As a result, the working droplet 210b has moved to the left (along the shuttle channel, away from the first location 201 of the payload channel). The motion of the working droplet 210b causes fluid flows through the shuttle channel and the payload channel (illustrated in FIG. 1B by the arrows; the magnitude of flow through a particular portion of the pump 100 is indicated by the weight of the arrow). Additionally, this operation causes a pressure within the first location 201 to be less than pressures in the inlet portion and the outlet portion. Accordingly, fluid flows occur in a preferred direction through the first diffuser 240a and in a non-preferred direction through the second diffuser 140b into the first location 201.

Thus, a larger magnitude of fluid flow occurs, during the first period of time, through the first diffuser 240a, toward the outlet portion, and a smaller fluid flow occurs through the second diffuser 240b toward the inlet portion. The highest magnitude flow is through the shuttle channel, away from the first location 201. As a result, a small magnitude flow of the payload fluid 210a occurs from the outlet portion toward the first location 201 and a larger magnitude flow of the payload fluid 210a occurs from the inlet portion toward the first location 201 during the first period of time.

Figure 2C:
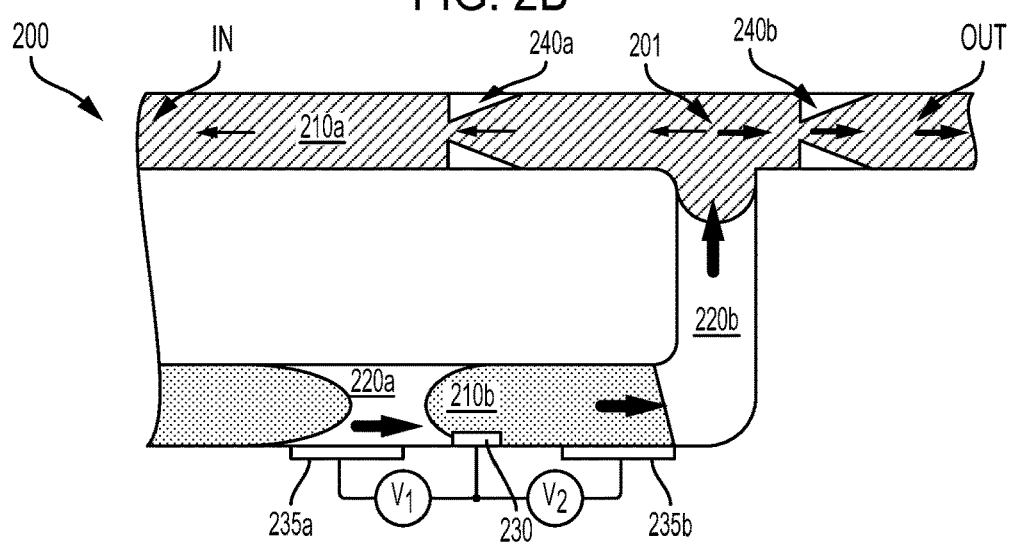
FIG. 2C is a schematic illustration of the example pump of FIG. 2A being operated during a second period of time.

In order to produce a net flow of the payload fluid 210a from the inlet portion to the outlet portion of the payload channel, the pump may be operated to move the working droplet 210b back and forth along the shuttle channel. Such operation, during a second period of time, is illustrated by FIG. 2C. A voltage is now being applied between the third 235a and second 230 electrodes by the second voltage source $V_2$. As a result, the working droplet 210b has moved to the right (along the shuttle channel, toward the first location 201 of the payload channel). The motion of the working droplet 210b causes fluid flows through the shuttle channel and the payload channel (illustrated in FIG. 2C, as in FIG. 2B, by arrows). Additionally, this operation causes a pressure within the first location 201 to be greater than pressures in the inlet portion and the outlet portion. Accordingly, fluid flows occur in a non-preferred direction through the first diffuser 240a and in a preferred direction through the second diffuser 140b out of the first location 201.

Thus, a larger magnitude of fluid flow occurs, during the second period of time, through the second diffuser 240b toward the outlet portion, and a smaller fluid flow occurs through the first diffuser 240a toward the inlet portion. The highest magnitude flow is through the shuttle channel, toward the first location 201. As a result, a larger magnitude flow of the payload fluid 210a occurs from the first location 201 toward the outlet portion and a larger magnitude flow of the payload fluid 210a occurs from the first location 201 toward the outlet portion during the second period of time. Accordingly, the electrodes 235a, 235b, 230 of the pump 200 can be operated, during alternating periods of time, to move the working droplet 210b in opposite directions along the shuttle channel to result in a net flow of payload fluid 210a from the inlet portion to the outlet portion of the payload channel.

Figure 3:
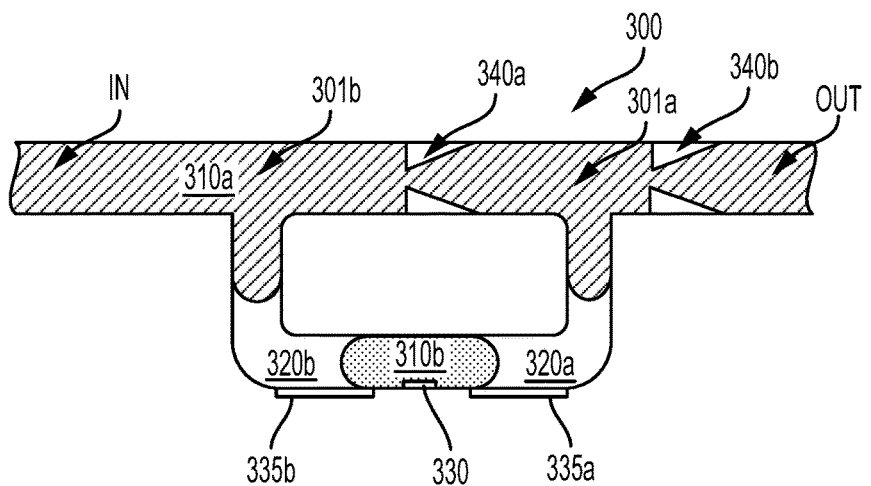
FIG. 3 is a schematic illustration of an example pump.

In another example, a pump as described herein could be configured similarly to the pump 100 illustrated in FIGS. 1A-C, but the shuttle channel of such a pump could be connected to the payload channel at different locations, relative to the valves. FIG. 3 illustrates, in a cross-sectional schematic, an example embodiment of such a pump 300. The pump 300 includes a first channel (the straight channel at the top of the pump 300, alternatively referred to as a payload channel) that contains a payload fluid 310a. The payload channel includes an inlet portion ("IN") and an outlet portion ("OUT"). During operation of the pump 300, the payload fluid 310a may be pumped from the inlet portion toward the outlet portion. A second channel (the U-shaped channel at the bottom of the pump 300, alternatively referred to as a shuttle channel) has a first end coupled to the payload channel at a first location 301a along the payload channel. A first diffuser 340a is disposed within the payload channel between the first location 301a and the inlet portion of the payload channel and a second diffuser 340b is disposed within the payload channel between the first location 301a and the outlet portion of the payload channel. The shuttle channel also includes a second end that is coupled to a second location 301b along the payload channel, between the first diffuser 340b and the inlet portion of the payload channel.

A first droplet of fluid 320a, a second droplet of fluid 320b, and a third droplet of fluid 310b are disposed within the shuttle channel, along with an amount of the payload fluid 310a. The first 320a and second 320b droplets of fluid are composed of a substance that is immiscible with both the third droplet 310b and with the payload fluid 310a. The third droplet 310b is disposed within the shuttle channel between the first 320a and second 320b droplets. First 335a, second 330, and third 335b electrodes are disposed within the shuttle channel.

In some examples, a pump as described herein could be configured to operate using only two electrodes. Such an operation could be provided to simplify the construction of the pump, to simplify electronics used to operate the pump, and/or to provide some other benefit. In such pumps, voltage could be applied between such two electrodes to manipulate a working droplet of the pump (e.g., to move the working droplet from a first location to a second location within a shuttle channel of the pump). The pump could include an energy storage element (e.g., an elastic reservoir or other elastic element, a set of surface coatings within the shuttle channel of the pump, a bubble or other volume of a gas or other compressible fluid in fluid communication with the shuttle channel) that could store an amount of energy when the working droplet is moved by application of a voltage between the two electrodes. When the voltage between the two electrodes is removed, reduced, or otherwise changed, the energy storage element could exert a force to return the working droplet to its original location. This motion of the working droplet could be transmitted, via one or more isolating droplets of the pump, to a payload fluid of the pump. Such repeated, oscillating motion could then be translated, via the action of one or more diffusers or other valves of the pump, into a net flow of the payload fluid through the pump.

Figure 4A:
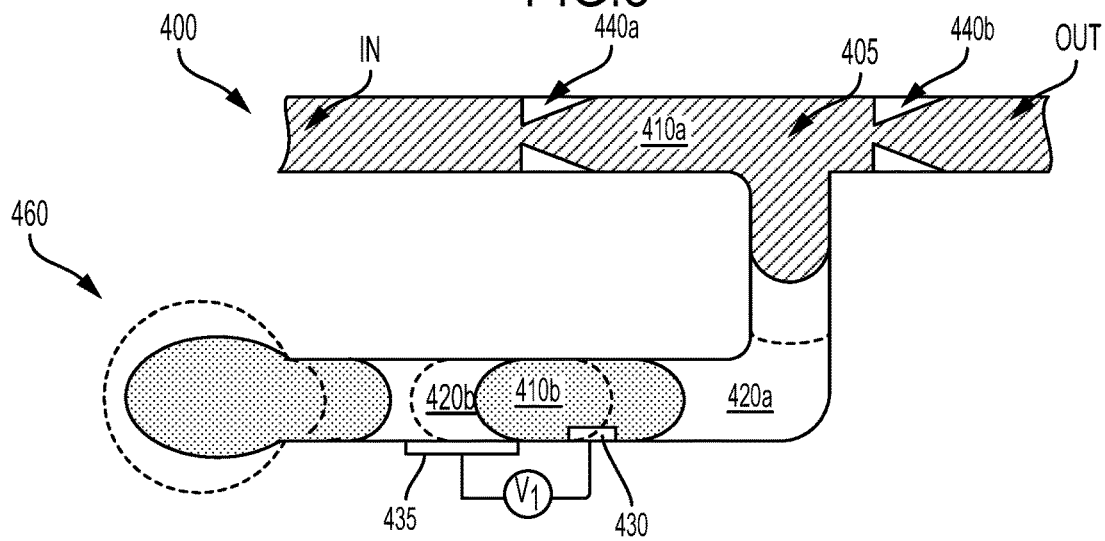
FIG. 4A is a schematic illustration of an example pump.

In some examples, the energy storage element could include an elastic reservoir coupled to the shuttle channel. FIG. 4A illustrates, in a cross-sectional schematic, an example embodiment of such a pump 400. The pump 400 includes a first channel (the straight channel at the top of the pump 400, alternatively referred to as a payload channel) that contains a payload fluid 410a. The payload channel includes an inlet portion ("IN") and an outlet portion ("OUT"). During operation of the pump 400, the payload fluid 410a may be pumped from the inlet portion toward the outlet portion. A second channel (the L-shaped channel at the bottom of the pump 400, alternatively referred to as a shuttle channel) has a first end coupled to the payload channel at a first location 405 along the payload channel. A first diffuser 440a is disposed within the payload channel between the first location 405 and the inlet portion of the payload channel and a second diffuser 440b is disposed within the payload channel between the first location 405 and the outlet portion of the payload channel. The shuttle channel also includes a second end that is in fluid communication with an elastic reservoir 460. The elastic reservoir 460 is constructed from elastic materials such that the volume of the elastic reservoir 460 is related to a pressure applied to the elastic reservoir 460 via the shuttle channel (e.g., a pressure applied via motion of the working droplet 410b within the shuttle channel).

A first isolator droplet 420a, a second isolator droplet 420b, and a working droplet 410b are disposed within the shuttle channel, along with an amount of the payload fluid 410a. The first 420a and second 420b isolator droplets of fluid are composed of a substance that is immiscible with both the working droplet 410b and with the payload fluid 410a. The working droplet 410b is disposed within the shuttle channel between the first 420a and second 420b isolator droplets. First 430 and second 435 electrodes are disposed within the shuttle channel such that the working droplet 410b is in contact with the first electrode 430.

During a first period of time, a voltage (e.g. a time-varying voltage waveform) is applied between the first 430 and second 435 electrodes. This induces a motion of the working droplet 410b away from the first location 405. The locations of the working droplet 410b and isolator droplets 420a, 420b during the first period of time are indicated by dashed lines in FIG. 4A. The motion of the working droplet 410a during the first period of time causes an increase in pressure within the elastic reservoir 460, which causes an expansion of the elastic reservoir 460 (indicated by dashed lines in FIG. 4A). During a subsequent period of time, the voltage applied between the electrodes 430, 435 is reduced (e.g., substantially no voltage is applied) and the elastic reservoir 460 returns to its original shape, moving the working droplet 410b and isolator droplets 410a, 420b back to their original locations (indicated by solid lines in FIG. 4A). This motion of the working droplet 410b could be transmitted, via the isolating droplet 420a of the pump, to the payload fluid 410a. Such repeated, oscillating motion could then be translated, via the action of the diffusers 440a, 440b into a net flow of the payload fluid 410a through the pump 400.

Figure 4B:
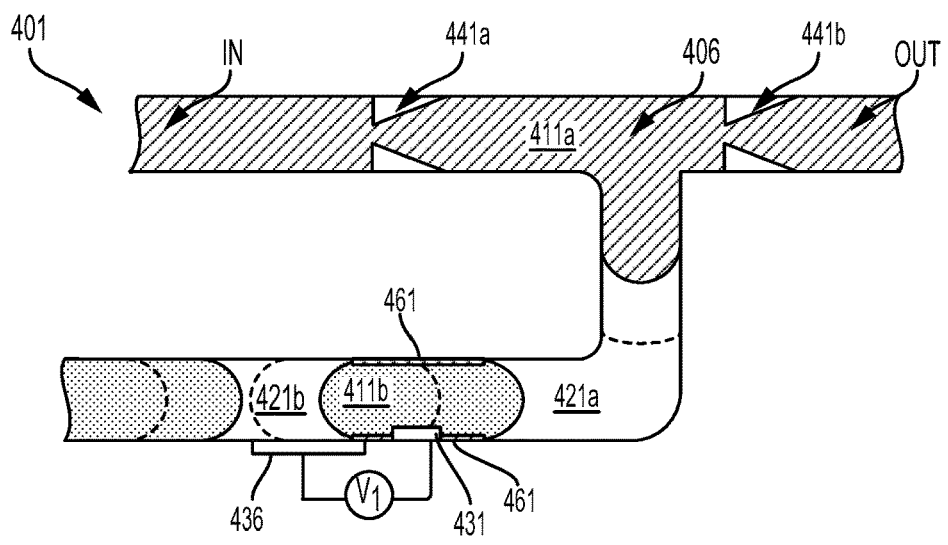
FIG. 4B is a schematic illustration of an example pump.

In some examples, the energy storage element could include surface coatings configured to provide a low-energy configuration of fluid droplets within the pump. FIG. 4B illustrates, in a cross-sectional schematic, an example embodiment of such a pump 401. The pump 401 includes a first channel (the straight channel at the top of the pump 401, alternatively referred to as a payload channel) that contains a payload fluid 411a. The payload channel includes an inlet portion ("IN") and an outlet portion ("OUT"). During operation of the pump 401, the payload fluid 411a may be pumped from the inlet portion toward the outlet portion. A second channel (the L-shaped channel at the bottom of the pump 401, alternatively referred to as a shuttle channel) has a first end coupled to the payload channel at a first location 406 along the payload channel. A first diffuser 441a is disposed within the payload channel between the first location 406 and the inlet portion of the payload channel and a second diffuser 441b is disposed within the payload channel between the first location 406 and the outlet portion of the payload channel.

A first isolator droplet 421a, a second isolator droplet 421b, and a working droplet 411b are disposed within the shuttle channel, along with an amount of the payload fluid 411a. The first 421a and second 421b isolator droplets of fluid are composed of a substance that is immiscible with both the working droplet 411b and with the payload fluid 411a. The working droplet 411b is disposed within the shuttle channel between the first 421a and second 421b isolator droplets. First 431 and second 436 electrodes are disposed within the shuttle channel such that the working droplet 411b is in contact with the first electrode 431.

The shuttle channel also includes a coating 461 that attracts the fluid of the working droplet 411b, e.g., by having a lower interfacial energy relative to the substance of the working droplet 411b than an interfacial energy between the fluid of the working droplet 411b and the fluid(s) of the isolator droplets 421a, 421b. For example, the working droplet 411b could be an aqueous fluid and the surface coating 461 could be a superhydrophilic coating and/or an oleophobic or underwater oleophobic coating. The presence of the coating 461 results in the working droplet 411b having a "rest location" within the shuttle channel (shown in solid lines in FIG. 4B) to which the working droplet 411b may move in the absence of externally-applied forces.

During a first period of time, a voltage (e.g. a time-varying voltage waveform) is applied between the first 431 and second 436 electrodes. This induces a motion of the working droplet 411b away from the first location 406. The locations of the working droplet 411b and isolator droplets 421a, 421b during the first period of time are indicated by dashed lines in FIG. 4B. During a subsequent period of time, the voltage applied between the electrodes 431, 436 is reduced (e.g., substantially no voltage is applied) and the coating 461 causes the working droplet 410b and isolator droplets 410a, 420b to return back to their original locations (indicated by solid lines in FIG. 4B). This motion of the working droplet 411b could be transmitted, via the isolating droplet 421a of the pump, to the payload fluid 411a. Such repeated, oscillating motion could then be translated, via the action of the diffusers 441a, 441b into a net flow of the payload fluid 411a through the pump 401.

The diffusers illustrated in FIGS. 1A-C, 2A-C, 3, and 4A-B are intended as non-limiting examples of valves or other flow rectification elements that could be used in a pump as described herein. Deformable and/or movable leaflets or otherwise-configured elements of mechanical valves, flow directors, nozzle-diffusers, or other types of valves could additionally or alternatively be used to implement such pumps.

In some examples, one or more mechanical valves could be used to rectify or otherwise control fluid flows in a pump as described herein. Such mechanical valves could be formed from polymeric materials, metals, or other materials to include reeds, membranes, leaves, hinges, or other elements that could deform, translate, rotate, or otherwise move to provide less resistance to fluid flow in a preferred direction through the mechanical valve than to fluid flows through the valve in an opposite, non-preferred direction. Such mechanical valves could be formed from the same material as a channel within which the mechanical valve is disposed (e.g., the mechanical valve could be formed in a mold that also includes features corresponding to the channel) and/or such mechanical valves could include discrete elements (e.g., metal foils or other formed elements) that are assembled together with other elements to form a pump as described herein.

Figure 5A:
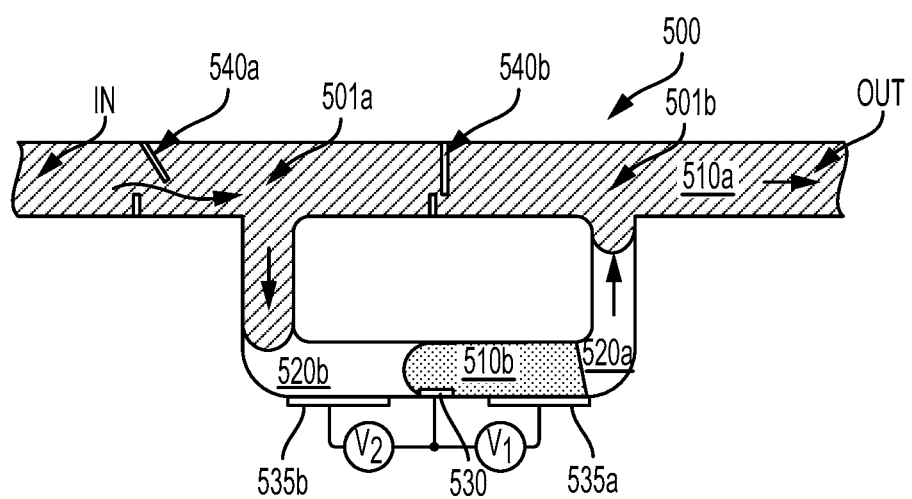
FIG. 5A is a schematic illustration of an example pump being operated during a first period of time.

FIG. 5A illustrates, in a cross-sectional schematic, an example embodiment of such a pump 500 during a first period of time. The pump 500 includes a first channel (the straight channel at the top of the pump 500, alternatively referred to as a payload channel) that contains a payload fluid 510a. The payload channel includes an inlet portion ("IN") and an outlet portion ("OUT"). During operation of the pump 500, the payload fluid 510a may be pumped from the inlet portion toward the outlet portion. A second channel (the U-shaped channel at the bottom of the pump 500, alternatively referred to as a shuttle channel) has a first end coupled to the payload channel at a first location 501a along the payload channel and a second end coupled to the payload channel at a second location 501b along the payload channel. A first mechanical valve 540a is disposed within the payload channel between the first location 501a and the inlet portion of the payload channel and a second mechanical valve 540b is disposed within the payload channel between the first location 501a and the second location 50ab.

A first droplet of fluid 520a, a second droplet of fluid 520b, and a third droplet of fluid 510b are disposed within the shuttle channel, along with an amount of the payload fluid 510a. The first 520a and second 520b droplets of fluid (alternatively referred to as first 520a and second 520b isolator droplets) are composed of a substance that is immiscible with both the third droplet (alternatively referred to as a working droplet 510b) and with the payload fluid 510a. The working droplet 510b is disposed within the shuttle channel between the first 520a and second 520b isolator droplets. First 535a, second 530, and third 535b electrodes are disposed within the shuttle channel to facilitate manipulation of the working droplet 510b via electrowetting.

During the first period of time, voltage is being applied between the first 535a and second 530 electrodes by the first voltage source $V_1$. As a result, the working droplet 510b has moved to the right (along the shuttle channel, away from the first location 501a of the payload channel). The motion of the working droplet 510b causes fluid flows through the shuttle channel and the payload channel (illustrated in FIG. 5A by the arrows) and a decrease in the pressure in the first location 501a relative to the second location 501b and the inlet portion. As a result of these pressure drops, the first mechanical valve 540a is open and the second mechanical valve 540b is closed during the first period of time. Accordingly, fluid flow is occurring, during the first period of time, through the first mechanical valve 440a into the shuttle channel and from the shuttle channel toward the outlet portion.

Figure 5B:
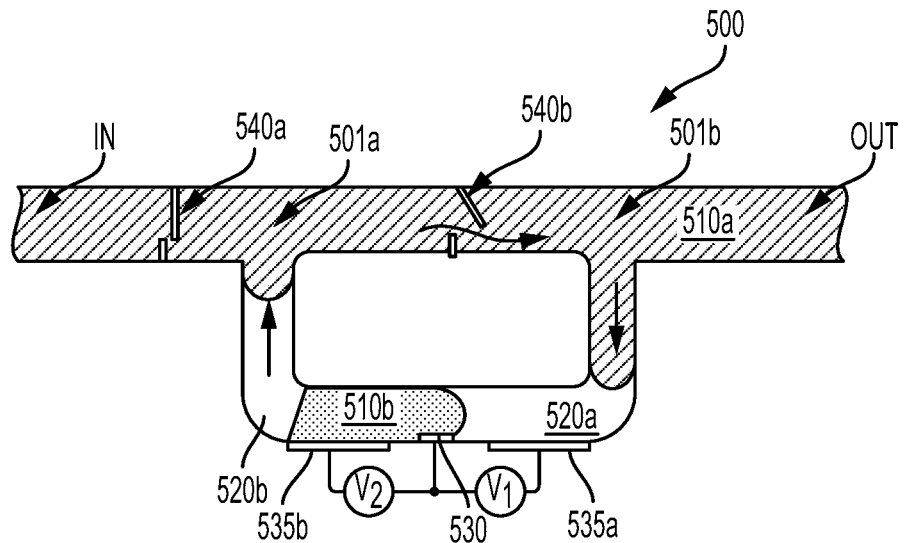
FIG. 5B is a schematic illustration of the example pump of FIG. 5A being operated during a second period of time.

In order to produce a continued flow of the payload fluid 510a from the inlet portion to the outlet portion of the payload channel, the pump may be operated to move the working droplet 210b back and forth along the shuttle channel. Such operation, during a second period of time, is illustrated by FIG. 5B. A voltage is now being applied between the third 535a and second 530 electrodes by the second voltage source $V_2$. As a result, the working droplet 510b has moved to the left (along the shuttle channel, toward the first location 501a of the payload channel). The motion of the working droplet 510b causes fluid flows through the shuttle channel and the payload channel (illustrated in FIG. 5B, as in FIG. 5A, by arrows) and an increase in the pressure in the first location 501a relative to the second location 501b and the inlet portion. As a result of these pressure drops, the first mechanical valve 540a is closed and the second mechanical valve 540b is open during the second period of time. Accordingly, fluid flow is occurring, during the second period of time, through the second valve 440b from the first location 501a toward the second location 501b. Thus, the electrodes 535a, 535b, 530 of the pump 500 can be operated, during alternating periods of time, to move the working droplet 510b in opposite directions along the shuttle channel to result in a flow of payload fluid 510a from the inlet portion to the outlet portion of the payload channel.

In some examples, one or more nozzles, venturi, or other types of flow director could be used to rectify or otherwise control fluid flows in a pump as described herein. Such flow directors leverage hydrodynamics and the momentum of fluid flow to control an overall amount of flow through channels of a pump. For example, a flow director could be configured to direct flows from an end of a shuttle channel into a payload channel in a preferred direction (e.g., toward an outlet portion of a pump). As a result, when fluid is flowing out of the end of the shuttle channel, more fluid flows in the preferred direction than in the opposite direction. Conversely, when fluid is flowing into the end of the shuttle channel via the flow director, a more equal amount of fluid could flow into the shuttle channel from either direction along the payload channel. Such flow directors could be formed from polymeric materials, metals, or other materials. Such flow directors could be formed from the same material as a channel within which the flow director is disposed (e.g., the flow director could be formed in a mold that also includes features corresponding to the channel) and/or such flow directors could be discrete elements (e.g., metal foils or other formed elements) that are assembled together with other elements to form a pump as described herein.

Figure 6A:
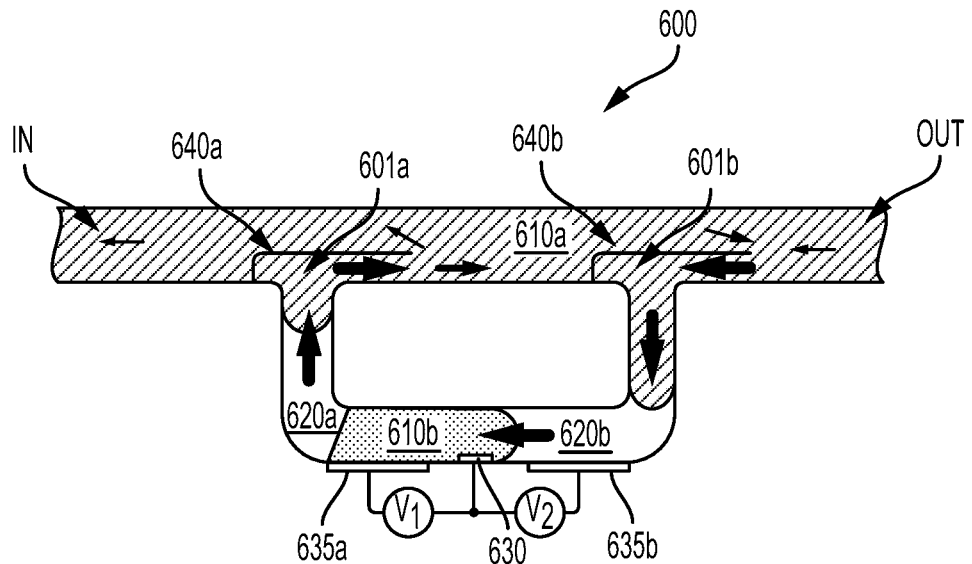
FIG. 6A is a schematic illustration of an example pump being operated during a first period of time.

FIG. 6A illustrates, in a cross-sectional schematic, an example embodiment of such a pump 600 during a first period of time. The pump 600 includes a first channel (the straight channel at the top of the pump 600, alternatively referred to as a payload channel) that contains a payload fluid 610a. The payload channel includes an inlet portion ("IN") and an outlet portion ("OUT"). During operation of the pump 600, the payload fluid 610a may be pumped from the inlet portion toward the outlet portion. A second channel (the U-shaped channel at the bottom of the pump 600, alternatively referred to as a shuttle channel) has a first end coupled to the payload channel at a first location 601a along the payload channel and a second end coupled to the payload channel at a second location 601b along the payload channel. A first flow director 640a is disposed within the payload channel between at the first location 601a, between the first end of the shuttle channel and the inlet portion of the payload channel. A second flow director 640b is disposed within the payload channel at the second location 601b, between the second end of the shuttle channel and the first end of the shuttle channel.

A first droplet of fluid 620a, a second droplet of fluid 620b, and a third droplet of fluid 610b are disposed within the shuttle channel, along with an amount of the payload fluid 610a. The first 620a and second 620b droplets of fluid (alternatively referred to as first 620a and second 620b isolator droplets) are composed of a substance that is immiscible with both the third droplet (alternatively referred to as a working droplet 610b) and with the payload fluid 610a. The working droplet 610b is disposed within the shuttle channel between the first 620a and second 620b isolator droplets. First 635a, second 630, and third 635b electrodes are disposed within the shuttle channel to facilitate manipulation of the working droplet 610b via electrowetting.

During the first period of time, voltage is being applied between the first 635a and second 630 electrodes by the first voltage source $V_1$. As a result, the working droplet 610b has moved to the left (along the shuttle channel, toward the first location 601a of the payload channel). The motion of the working droplet 610b causes fluid flows through the shuttle channel and the payload channel (illustrated in FIG. 6A by the arrows; the magnitude of flow through a particular portion of the pump 600 is indicated by the weight of the arrow). The highest magnitude flow is through the shuttle channel, toward the first location 601. Due to the flow-rectifying effects of the flow directors 640a, 640b, a larger magnitude of fluid flow occurs, during the first period of time, from the first flow director 640a toward the outlet portion and a smaller fluid flow occurs from the first flow director 640a toward the inlet portion. Conversely, a roughly equal amount of fluid flow occurs, via the second flow director 640b, from the outlet portion into the shuttle channel as occurs from the direction of the inlet portion into the shuttle channel. As a result, a small magnitude flow of the payload fluid 610a occurs from the outlet portion toward the second location 601b and a small magnitude flow of the payload fluid 610a occurs from the first location 601a toward the inlet portion during the first period of time.

Figure 6B:
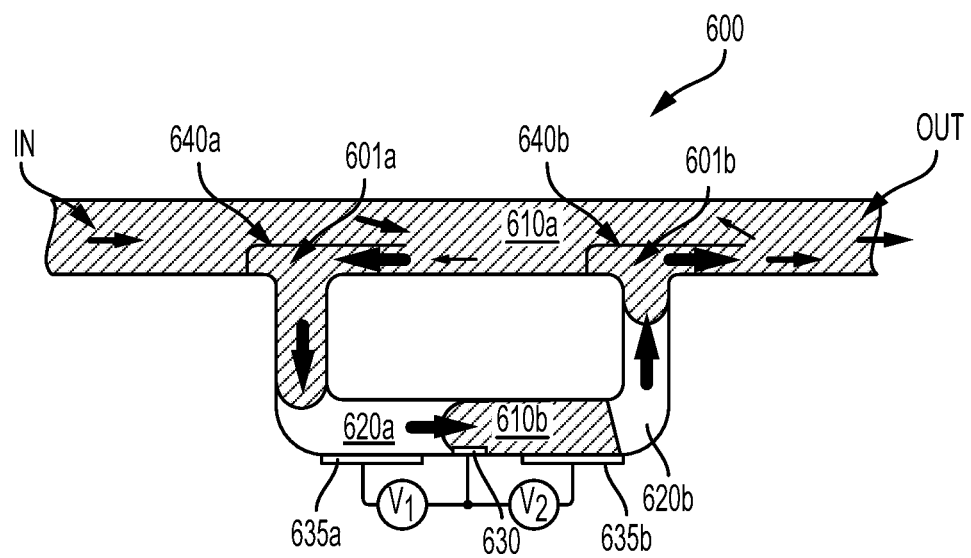
FIG. 6B is a schematic illustration of the example pump of FIG. 6A being operated during a second period of time.

In order to produce a net flow of the payload fluid 610a from the inlet portion to the outlet portion of the payload channel, the pump may be operated to move the working droplet 610b back and forth along the shuttle channel. Such operation, during a second period of time, is illustrated by FIG. 6B. A voltage is now being applied between the third 635a and second 630 electrodes by the second voltage source $V_2$. As a result, the working droplet 610b has moved to the right (along the shuttle channel, toward the second location 601b of the payload channel). The motion of the working droplet 610b causes fluid flows through the shuttle channel and the payload channel (illustrated in FIG. 6B, as in FIG. 6A, by arrows). The highest magnitude flow is through the shuttle channel, toward the first location 201. Due to the flow-rectifying effects of the flow directors 640a, 640b, a larger magnitude of fluid flow occurs, during the second period of time, from the second flow director 640b toward the outlet portion and a smaller fluid flow occurs from the first second flow director 640b toward the inlet portion. Conversely, a roughly equal amount of fluid flow occurs, via the first flow director 640a, from the inlet portion into the shuttle channel as occurs from the direction of the outlet portion into the shuttle channel. As a result, a larger magnitude flow of the payload fluid 610a occurs from the second location 601b toward the outlet portion during the second period of time. Thus, the electrodes 635a, 635b, 630 of the pump 600 can be operated, during alternating periods of time, to move the working droplet 610b in opposite directions along the shuttle channel, resulting in a net flow of payload fluid 610a from the inlet portion to the outlet portion of the payload channel.

It is noted that relative dimensions in the figures (e.g., FIGS. 1A-C, 2A-C, 3, 4A-B, 5A-B, 6A-B) are not necessarily to scale, but have been rendered for purposes of explanation only in describing the arrangement of elements of a pump as described herein. Dimensions of elements of a pump herein could be sized according to an application. For example, the diameters of channels (e.g., shuttle channels) of pumps as described herein could be specified to control an efficiency or other operational parameters of a pump as described herein. For example, a shuttle channel of a pump as described herein (e.g., the shuttle channel of pump 100) could have a diameter or related characteristic dimension that is less than 1 centimeter and greater than 1 millimeter. In some examples, the relative diameters, areas, or other related characteristic dimensions of shuttle channels and payload channels of pumps as described herein could be specified to control an output pressure, a flow rate, or some other property of such pumps. For example, a ratio between a diameter or related characteristic dimension of a shuttle channel of a pump as described herein (e.g., the shuttle channel of pump 100) and that of a payload channel of such a pump could be greater than two. This could include the shuttle channel having a diameter more than twice as large as the payload channel, e.g., to increase an output pressure and/or flow rate of the pump. Alternatively, this could include the payload channel having a diameter more than twice as large as the shuttle channel.

III. Example Electronics of Devices

Figure 7:
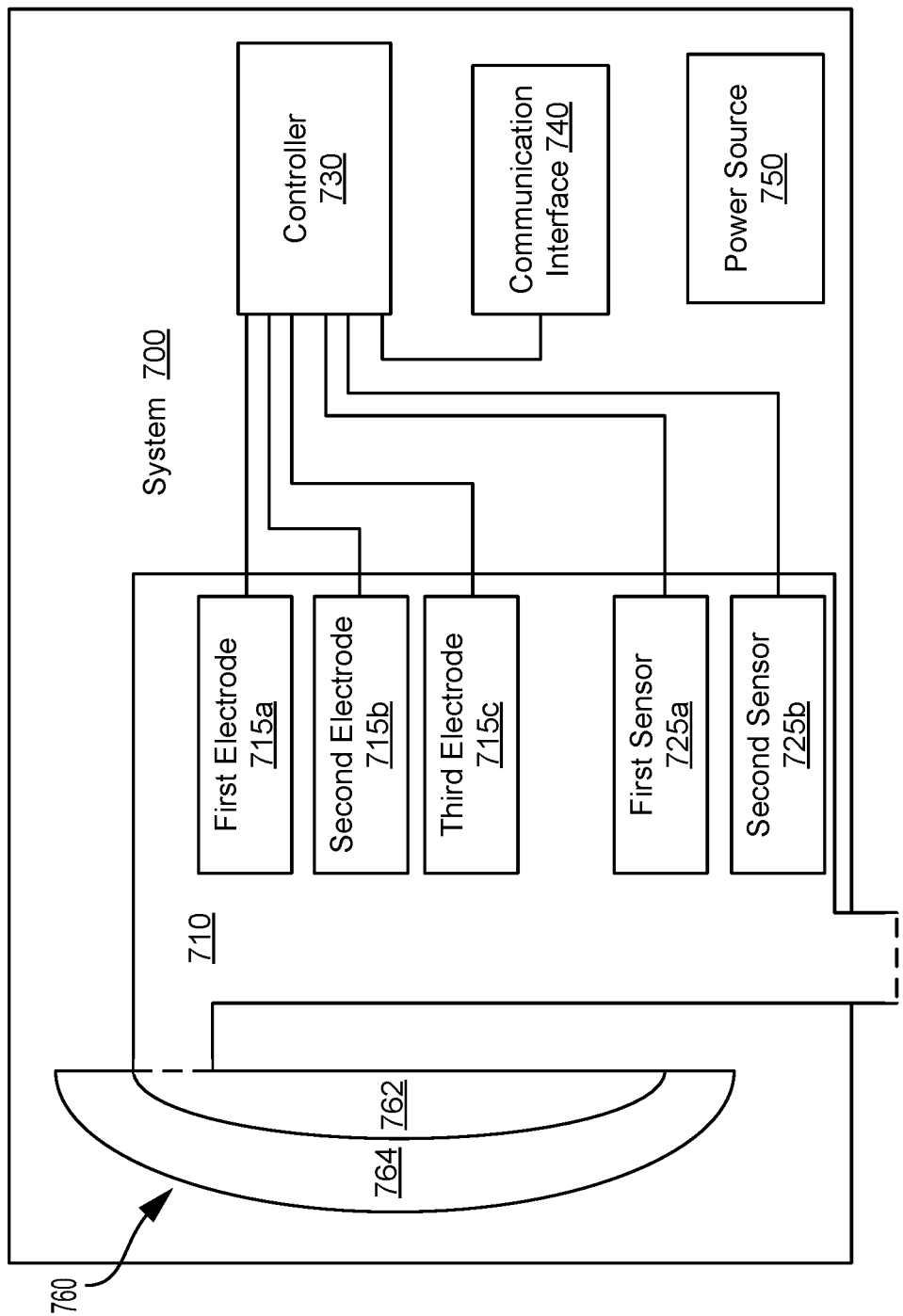
FIG. 7 is a block diagram of an example system.

FIG. 7 is a block diagram of a system 700 that includes a pump 710 as described herein. Such a pump (e.g., 710) could be coupled (e.g., via an inlet portion and/or an outlet portion of the pump) to an external environment of a system (e.g., a surface of an eye, a portion of vasculature, a tissue, a location within a pharmaceutical or other manufacturing process), an internal reservoir of the system (e.g., a reservoir containing a drug), a lens chamber of a fluidic lens, one or more microfluidic channels of a lab-on-a-chip, flow cytometry instrument, or other scientific apparatus, or to some other location or volume according to an application. The system 700 and/or the pump 710 could be a discrete device configured according to an application (e.g., the system 700 could be shaped to be contact-mounted to an eye or other body surface and to operate the pump 710 in furtherance of some application). Alternatively, the system 700 and/or the pump 710 could be elements of some other system or apparatus and could be provided to a manufacturer to be incorporated into such a system or apparatus.

The system 700 includes an adjustable lens 760 containing a first fluid 762 and a second fluid 764. The first 762 and second 764 fluids are immiscible in each other. The pump 710 is in fluid communication with the adjustable lens 760 and can be operated to pump an amount of the first fluid 762 into and/or out of the adjustable lens 760, controlling the overall optical power of the adjustable lens 760.

The system 700 includes first 715a, second 715b, and third 715c electrodes incorporated into the pump 710 as described elsewhere herein. Also incorporated into the pump 710 are first 725a and second 725b sensors configured to detect properties of one or more fluids present at one or more locations on or within the pump 710. The system 700 also includes a communication interface 740, a controller 730 that is operably coupled to the electrodes 715a, 715b, 715c, the sensors 725a, 725b, and the communication interface, and a power source 750 that provides power to the system 700.

The controller 730 is configured to apply voltages to the electrodes 715a, 715b, 715c in order to pump fluid(s) using the pump 710. This includes applying voltages between pairs of the electrodes 715a, 715b, 715c during respective different periods of time in order to, e.g., move a droplet of working fluid within the pump 710. Applying voltage between a pair of electrodes (e.g., between the first electrode 715a and the second electrode 715b) could include applying, during a particular period of time, a substantially constant voltage between the electrodes. Alternatively, a time-varying voltage waveform could be applied during the particular period of time. Such a time-varying voltage waveform could include a square waveform, a triangle waveform, a sinusoidal waveform, or some other time-varying pattern of voltage. The controller could subsequently apply voltage between a different pair of electrodes (e.g., between the third electrode 715c and the second electrode 715b) and could alternate between applying voltages to two pairs of electrodes, or could apply voltages to pairs of electrodes according to some other scheme, to effect pumping of fluid through the pump 710 as described elsewhere herein.

In some examples, the controller 730 could include oscillators, clocks, counters, state machines, flip-flops, or other elements configured to provide a pre-specified pattern of voltages between pairs of the electrodes 715a, 715b, 715c in order to pump fluid through the pump 710. In such examples, the controller 730 could commence such operation in response to being powered, or in response to receiving an enable signal via one or more logical inputs. In such examples, the communication interface 740 could comprise one (or more) conductors configured to transmit such a power and/or enable signal from some other component or system (e.g., from another controller of the system 700). Additionally or alternatively, the controller 730 could include one or more processors configured to execute program instructions (e.g., program instructions stored in a memory of the controller 730) that could cause the controller 730 to perform the operations described herein (e.g., to apply voltages to the electrodes 715a, 715b, 715c in order to pump fluid). Such program instructions could also include instructions to operate the sensors 725a, 725b or the communication interface 740 or to perform some other operations.

The controller could include analog-to-digital converters, constant-current sources, voltage references, amplifiers, comparators, or other components to facilitate operating the sensor(s) 725a, 725b to detect properties of fluids disposed within the pump 710. The controller could operate to detect such properties at regular intervals or according to some other scheme. Further, the controller could be configured to operate the pump 710 in concert with the sensor(s) 725a, 725b. For example, the controller could operate the pump 710 to pump fluid into the system 700 into proximity with the sensor(s) 725a, 725b such that the sensor(s) 725a, 725b can detect a property of the pumped fluid that more accurately reflects the status of fluid in the environment from which the pump 710 is pumping fluid. In such examples, the controller 730 could repeatedly operate the sensor(s) 725a, 725b to detect the property of the pumped fluid until the detected property values have stabilized (indicating, e.g., that the detected property of the fluid in the pump accurately corresponds to the corresponding property of fluid in the environment of the system 700). Responsive to determining that the detected values have stabilized (e.g., determining that a particular value differs from a previous value by less than a specified amount or percent), the controller 730 could stop pumping fluid using the pump 710 and/or could perform some other operations.

The communication interface 740 could include a variety of components to facilitate communication between the controller 730 and an external system (e.g., a controller device in wireless communication with the system 700) and/or between the controller 730 and other components of the system 700. For example, the communication interface 740 could include oscillators, mixers, amplifiers, filters, transmitters, receivers, encoders, or other components for transmitting and/or receiving wireless transmissions. Additionally or alternatively, the communication interface 740 could include one or more traces, wires, or other conductors for transmitting wired commands or other signals to or from the controller 730. The controller 730 could be configured to receive commands or other information via the communication interface 740, e.g., to operate the pump 710 to pump fluid, to control one or more operational parameters of such pumping (e.g., a waveform, magnitude, or other property of voltages applied to the electrodes 715a, 715b, 715c, a timing of application of such voltages), to operate the sensor(s) 725a, 725b to detect a property of a fluid in the pump 710. The controller 730 could be configured to transmit information via the communication interface 740, e.g., to transmit indications of information detected using the sensor(s) 725a, 725b.

The power source 750 could include a battery, a fuel cell, or some other source of energy to power the operations of the system 700. Additionally or alternatively, the power source 750 could include means for receiving power from a source outside of the system. For example, the power source 750 could include a solar cell, an RF antenna for receiving RF wireless power, power conditioning circuitry for receiving power from a wired interface, or some other means for receiving and/or conditioning external power. In some examples, the power source 750 could include a rechargeable battery. In such examples, the power source 750 could include a recharger configured to recharge the rechargeable battery using power received from outside of the system 700.

The system 700 could include additional or alternative elements, and could include more or fewer elements than those illustrated in FIG. 7. This could include the system 700 having fewer or more electrodes than the three illustrated, or fewer or more sensors than the two illustrated. In an example, the system could include an actuated lens having a chamber that contains two or more immiscible fluids. The pump 710 could be coupled to such a lens chamber to facilitate controlling the optical power of the actuated lens by pumping one or more of the fluids into and/or out of the lens chamber.

IV. Example Methods

Figure 8:
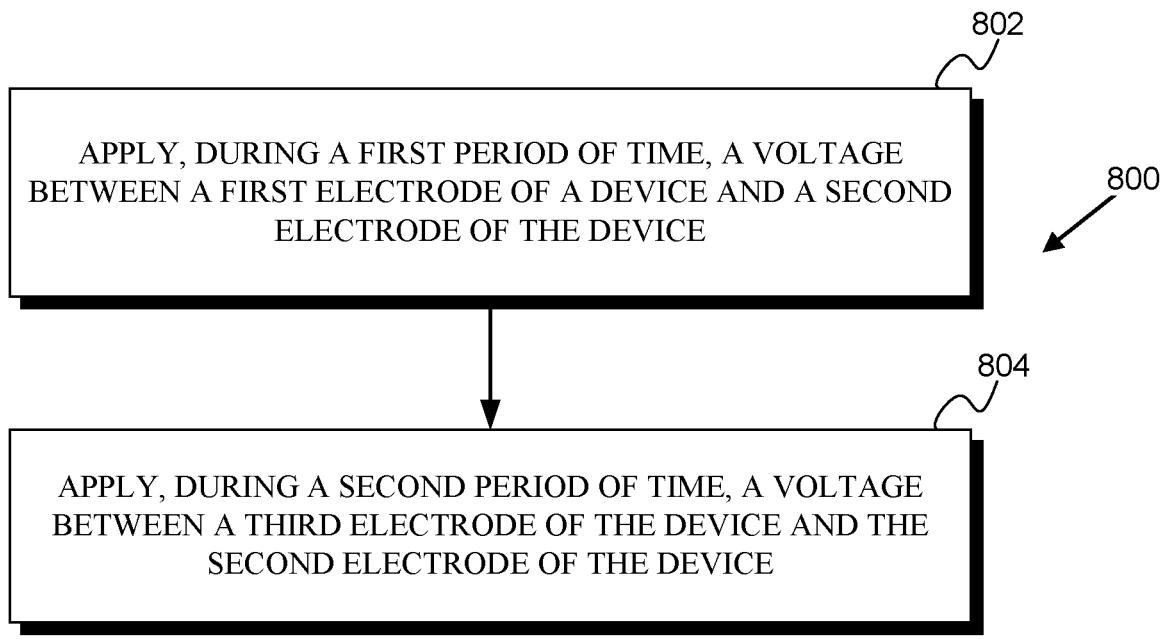
FIG. 8 is a flowchart of an example process.

FIG. 8 is a flowchart of a method 800 for operating a device as described herein to pump fluid. The device includes (i) a first channel having an inlet portion and an outlet portion; (ii) a second channel, wherein a first end of the second channel is coupled to the first channel at a first location along the first channel between the inlet portion and the outlet portion; (iii) a first valve and a second valve, wherein the first valve is disposed within the first channel between the first location and the inlet portion, wherein the second valve is disposed within the first channel between the first location and the outlet portion; (iv) a first electrode, a second electrode, and a third electrode, wherein the first, second, and third electrodes are disposed within the second channel, wherein the second electrode is disposed within the second channel between the first electrode and the first end of the second channel, and wherein the third electrode is disposed within the second channel between the second electrode and the first end of the second channel; (v) a first droplet of fluid and a second droplet of fluid, wherein the first and second droplets of fluid are disposed within the second channel; and (vi) a third droplet of fluid, wherein the third droplet of fluid is immiscible with the first droplet of fluid and the second droplet of fluid, wherein the third droplet of fluid is disposed within the second channel between the first droplet of fluid and the second droplet of fluid and in contact with the second electrode.

The method 800 includes applying, during a first period of time, a voltage between the first electrode of the device and the second electrode of the device (802). This could include applying a substantially constant voltage (e.g., 5V) during the first period of time. Alternatively, a square waveform, a triangular waveform, a sinusoidal waveform, or some other time-varying waveform could be applied between the first and second electrodes. A frequency of variation of such a time-varying applied voltage (e.g., a frequency of an applied square waveform) could be greater than a characteristic time of motion of the droplet(s) within the second channel in response to applied voltages (e.g., greater than 100 Hz, greater than 1 kHz).

The method 800 also includes applying, during a second period of time, a voltage between the third electrode of the device and the second electrode of the device (804). This could include applying a substantially constant voltage (e.g., 5V) during the second period of time. Alternatively, a square waveform, a triangular waveform, a sinusoidal waveform, or some other time-varying waveform could be applied between the third and second electrodes. A frequency of variation of such a time-varying applied voltage (e.g., a frequency of an applied square waveform) could be greater than a characteristic time of motion of the droplet(s) within the second channel in response to applied voltages (e.g., greater than 100 Hz, greater than 1 kHz).

The method 800 could include additional steps or elements in addition to those depicted in FIG. 8. For example, the method 800 could include repeating blocks 802 and 804 a number of times in order to continue pumping fluid. The method 800 could include detecting, using one or more sensors, a property of fluid disposed in the pump (e.g., to detect a concentration of glucose or some other analyte in tear fluid, blood, interstitial fluid, or some other fluid pumped into the pump from a biological tissue). The method 800 could include performing some operations based on such detected fluid properties, e.g., beginning to pump fluid, ceasing the pumping of fluid, or changing an operational parameter of fluid pumping based on one or more detected properties of fluid in the pump. For example, the method 800 could include pumping fluid while repeatedly detecting, using a sensor, a property of the pumped fluid. The method 800 could include determining whether the detected property has stabilized (e.g., determining that a particular detected value differs from a previously detected value by less than a specified amount or percent) and, responsive to such a determination, ceasing the pumping of fluid. The method 800 could include receiving an instruction and, responsive to the instruction, beginning to pump fluid, ceasing the pumping of fluid, or performing some other responsive action. The method 800 could include additional or alternative elements.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A device comprising:
a first channel having an inlet portion and an outlet portion;
a second channel, wherein a first end of the second channel is coupled to the first channel at a first location along the first channel between the inlet portion and the outlet portion;
a first valve and a second valve, wherein the first valve is disposed within the first channel between the first location and the inlet portion, wherein the second valve is disposed within the first channel between the first location and the outlet portion;
a first electrode, a second electrode, and a third electrode, wherein the first, second, and third electrodes are disposed within the second channel, wherein the second electrode is disposed within the second channel between the first electrode and the first end of the second channel, and wherein the third electrode is disposed within the second channel between the second electrode and the first end of the second channel;
a first fluid and a second fluid, wherein the first and second fluids are disposed within the second channel; and
a third fluid, wherein the third fluid is immiscible with the first fluid and the second fluid, wherein the third fluid is disposed within the second channel between the first fluid and the second fluid and in contact with the second electrode.

2. The device of claim 1, further comprising a controller, wherein the controller is electrically coupled to the first electrode, the second electrode, and the third electrode, and wherein the controller is configured to apply voltages to the first, second, and third electrodes to pump fluid from the inlet portion to the outlet portion, wherein applying voltages to the first, second, and third electrodes to pump fluid comprises:
applying, during a first period of time, a voltage between the first electrode and the second electrode; and
applying, during a second period of time, a voltage between the third electrode and the second electrode.

3. The device of claim 2, wherein applying, during the first period of time, a voltage between the first electrode and the second electrode comprises applying, during the first period of time, a time-varying voltage waveform between the first electrode and the second electrode.

4. The device of claim 2, further comprising:
a lens chamber; and
two or more fluids disposed within the lens chamber, wherein at least one of the inlet portion or the outlet portion is in fluid communication with the lens chamber.

5. The device of claim 2, wherein the inlet portion is in fluid communication with an external environment of the device and the outlet portion is in fluid communication with the external environment of the device.

6. The device of claim 1, further comprising a sensor, wherein the sensor is operable to detect a property of fluid disposed in the first channel.

7. The device of claim 1, wherein the first and second fluids are composed of an oil and wherein the third fluid is an aqueous fluid.

8. The device of claim 1, wherein a second end of the second channel is coupled to the first channel at a second location along the first channel, wherein the second location is between the first location and the inlet portion.

9. The device of claim 1, wherein a second end of the second channel is coupled to the first channel at a second location along the first channel, wherein the second location is between the first location and the outlet portion.

10. The device of claim 1, wherein the first channel has a first diameter, wherein the second channel has a second diameter, and wherein a ratio between the first diameter and the second diameter is greater than two.

11. The device of claim 1, wherein the first valve comprises a diffuser.

12. The device of claim 1, wherein the first valve comprises a mechanical valve.

13. The device of claim 1, wherein the first valve comprises a flow director, wherein the flow director is located at the first location, and wherein the flow director is configured to direct a fluid flow from the second channel into the first channel toward the outlet portion of the first channel.

14. The device of claim 1, wherein the first fluid has a melting point between 0 degrees Celsius and 37 degrees Celsius.

15. The device of claim 1, further comprising a septum, wherein the septum is disposed between the second channel and an external environment of the device such that the septum can be pierced in order to introduce a fluid into the second channel.

16. A device comprising:
a first channel having an inlet portion and an outlet portion;
a second channel, wherein a first end of the second channel is coupled to the first channel at a first location along the first channel between the inlet portion and the outlet portion;
a first valve and a second valve, wherein the first valve is disposed within the first channel between the first location and the inlet portion, wherein the second valve is disposed within the first channel between the first location and the outlet portion;
a first electrode, a second electrode, and a third electrode, wherein the first, second, and third electrodes are disposed within the second channel, wherein the second electrode is disposed within the second channel between the first electrode and the first end of the second channel, and wherein the third electrode is disposed within the second channel between the second electrode and the first end of the second channel; and a septum, wherein the septum is disposed between the second channel and an external environment of the device such that the septum can be pierced in order to introduce a fluid into the second channel.

17. The device of claim 16, wherein the first valve comprises a diffuser.

18. The device of claim 16, further comprising a sensor, wherein the sensor is operable to detect a property of fluid disposed in the first channel.

19. The device of claim 16, wherein the first channel has a first diameter, wherein the second channel has a second diameter, and wherein a ratio between the first diameter and the second diameter is greater than two.

20. A method for operating a device to pump fluid, wherein the device comprises:

a first channel having an inlet portion and an outlet portion;

a second channel, wherein a first end of the second channel is coupled to the first channel at a first location along the first channel between the inlet portion and the outlet portion;

a first valve and a second valve, wherein the first valve is disposed within the first channel between the first location and the inlet portion, wherein the second valve is disposed within the first channel between the first location and the outlet portion;

a first electrode, a second electrode, and a third electrode, wherein the first, second, and third electrodes are disposed within the second channel, wherein the second electrode is disposed within the second channel between the first electrode and the first end of the second channel, and wherein the third electrode is disposed within the second channel between the second electrode and the first end of the second channel;

a first fluid and a second fluid, wherein the first and second fluids are disposed within the second channel; and a third fluid, wherein the third fluid is immiscible with the first fluid and the second fluid, wherein the third fluid is disposed within the second channel between the first fluid and the second fluid and in contact with the second electrode;

wherein the method comprises:

applying, during a first period of time, a voltage between the first electrode and the second electrode; and applying, during a second period of time, a voltage between the third electrode and the second electrode.

21. The method of claim 20, wherein applying, during the first period of time, a voltage between the first electrode and the second electrode comprises applying, during the first period of time, a time-varying voltage waveform between the first electrode and the second electrode.

* * * * *